(12) United States Patent
Visweswariah et al.

(10) Patent No.: US 11,977,375 B2
(45) Date of Patent: May 7, 2024

(54) SCALABLE SYSTEMS AND METHODS FOR ASSESSING HEALTHY CONDITION SCORES IN RENEWABLE ASSET MANAGEMENT

(71) Applicant: Utopus Insights, Inc., Valhalla, NY (US)

(72) Inventors: Chandramouli Visweswariah, Valhalla, NY (US); Lars Toghill, Valhalla, NY (US); Joel Igba, Valhalla, NY (US); Neil Desai, Valhalla, NY (US); Younghun Kim, Pleasantville, NY (US); Yajuan Wang, White Plains, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 18/056,228

(22) Filed: Nov. 16, 2022

(65) Prior Publication Data

US 2023/0152795 A1  May 18, 2023

Related U.S. Application Data

(63) Continuation of application No. 17/133,591, filed on Dec. 23, 2020, now Pat. No. 11,509,136.
(Continued)

(51) Int. Cl.
*G05B 23/02* (2006.01)
*G06F 18/214* (2023.01)
(Continued)

(52) U.S. Cl.
CPC ..... *G05B 23/0283* (2013.01); *G05B 23/0227* (2013.01); *G06F 18/214* (2023.01);
(Continued)

(58) Field of Classification Search
CPC .. H02J 3/001; H02J 2300/28; G05B 23/0227; G05B 23/0283; G06K 9/6256
See application file for complete search history.

(56) References Cited

U.S. PATENT DOCUMENTS 10,956,632 B2  3/2021  Wang et al.
10,984,154 B2  4/2021  Wang et al.
(Continued)

FOREIGN PATENT DOCUMENTS

CN  1662876 A  8/2005
JP  3535393 B2  6/2004
(Continued)

OTHER PUBLICATIONS

Canizo, Mikel et al. "Real-time Predictive Maintenance for Wind Turbines Using Big Data Frameworks," arXiv:1709.07250, Sep. 2017.
(Continued)

*Primary Examiner* — Manuel L Barbee
(74) *Attorney, Agent, or Firm* — Ahmann Kloke LLP

(57) ABSTRACT

An example method comprises receiving historical wind turbine failure data and asset data from SCADA systems, receiving first historical sensor data, determining healthy assets of the renewable energy assets by comparing signals to known healthy operating signals, training at least one machine learning model to indicate assets that may potentially fail and to a second set of assets that are operating within a healthy threshold, receiving first current sensor data of a second time period, applying a machine learning model to the current sensor data to generate a first failure prediction a failure and generate a list of assets that are operating within a healthy threshold, comparing the first failure prediction to a trigger criteria, generating and transmitting a first alert if comparing the first failure prediction to the trigger criteria
(Continued)

indicates a failure prediction, and updating a list of assets to perform surveillance if within a healthy threshold.

21 Claims, 29 Drawing Sheets

Related U.S. Application Data

(60) Provisional application No. 62/955,403, filed on Dec. 30, 2019.

(51) Int. Cl.
  *G06N 20/00* (2019.01)
  *H02J 3/00* (2006.01)
(52) U.S. Cl.
  CPC .............. *G06N 20/00* (2019.01); *H02J 3/001* (2020.01); *H02J 2300/28* (2020.01)

(56) References Cited

U.S. PATENT DOCUMENTS

| | | |
|---|---|---|
| 11,016,468 B1 | 5/2021 | Barker et al. |
| 11,188,691 B2 | 11/2021 | Wang et al. |
| 11,422,529 B1 | 8/2022 | Barker et al. |
| 2011/0020122 A1 | 1/2011 | Parthasarathy et al. |
| 2011/0313726 A1 | 12/2011 | Parthasarathy |
| 2013/0073223 A1 | 3/2013 | Apira et al. |
| 2015/0073751 A1 | 3/2015 | Liao et al. |
| 2017/0074250 A1 | 3/2017 | Yu et al. |
| 2017/0310483 A1 | 10/2017 | Nagao et al. |
| 2017/0350370 A1 | 12/2017 | Son et al. |
| 2018/0223812 A1 | 8/2018 | Badrinath Krishna |
| 2018/0320658 A1 | 11/2018 | Herzog et al. |
| 2019/0003929 A1 | 1/2019 | Shapiro et al. |
| 2019/0042887 A1 | 2/2019 | Nguyen |
| 2019/0236456 A1 | 8/2019 | Kim |
| 2020/0049129 A1 | 2/2020 | Girardot |
| 2020/0201950 A1 | 6/2020 | Wang et al. |
| 2020/0210538 A1 | 7/2020 | Wang et al. |
| 2020/0210824 A1 | 7/2020 | Poornaki et al. |

FOREIGN PATENT DOCUMENTS

| | | | |
|---|---|---|---|
| WO | 2014043623 A1 | 3/2014 | |
| WO | 2018228648 A1 | 12/2018 | |
| WO | WO-2018228648 A1 * | 12/2018 | ............. F03D 17/00 |

OTHER PUBLICATIONS

European Patent Application No. 19903834.0, Search Report dated Aug. 26, 2022, 9 pages.
International Application No. PCT/US2019/068842, International Search Report and Written Opinion dated Apr. 1, 2020.
International Application No. PCT/US2020/067578 International Search Report and Written Opinion dated Mar. 30, 2021.
Zhao, Yingying et al. "Fault Prediction and Diagnosis of Wind Turbine Generators Using SCADA Data," Energies, vol. 10, No. 8, Aug. 2017.
X. Clady And et al., "A Motion-Based Feature for Event-Based Pattern Recognition", Frontiers in Neuroscience I www.frontiersin.org, Jan. 2017 | vol. 10 | Article 594 (Year: 2017).
Y. Song And et al., "Multiple Event Detection and Recognition for Large-Scale Power Systems Through Cluster-Based Sparse Coding", IEEE Transactions on Power Systems, vol. 32, No. 6, Nov. 2017 (Year: 2017).
European Patent application No. 20910911.5, Extended European Search Report dated Jan. 15, 2024, 11 pages.

* cited by examiner

FIG. 4 – Prior Art

| timestamp | assetid | slip speed differ | rotation speed | or speed differen | emp bearing de | temp g1l1 | temp g1l2 | temp g1l3 | ... |
|---|---|---|---|---|---|---|---|---|---|
| 1400029200 | 305000 | -0.2 | 1804.05 | -0.0333333 | 34.35 | 50.6167 | 50.1667 | 50.2833 | ... |
| 1400032800 | 305000 | -0.2 | 1805.52 | 0 | 34.4667 | 50.1833 | 50 | 50 | ... |
| 1400036400 | 305000 | -0.2 | 1806.28 | -0.05 | 33.8 | 50 | 49.65 | 49.85 | ... |
| 1400040000 | 305000 | -0.2 | 1802.83 | -0.05 | 33.5167 | 49.4 | 49.2 | 49.3 | ... |
| 1400043600 | 305000 | -0.2 | 1803.98 | -0.05 | 33 | 49.5667 | 48.9 | 49.2 | ... |
| ... | ... | ... | ... | ... | ... | ... | ... | ... | ... |

FIG. 7

Event Log Example

| TurbineId | EventCodeNumber | TurbineEventType | EventStartUTC | EventStopedUTC | Description | TurbineEventID | Param1 | Param2 |
|---|---|---|---|---|---|---|---|---|
| 30367 | 265 | 0 | 11/30/17 23:11 | 12/1/17 0:11 | Wind:7.6 m/s Gen: 1560.4 RPM | 8857407920 | 76 | 15604 |
| 30367 | 266 | 0 | 11/30/17 23:11 | 12/1/17 0:11 | Pitch:-2.1∞ Power:672.3 kW | 8857407921 | -21 | 6723 |
| 30367 | 442 | 0 | 11/30/17 23:28 | 12/1/17 0:28 | Remote power setpoint 2000kW | 8858033305 | 2000 | 0 |
| 30367 | 115 | 0 | 11/30/17 23:31 | 12/1/17 0:31 | Generator 1 out | 8857882705 | 1 | 0 |

FIG. 8A

Event Meta Data Example

| EventDescription | EventCode |
|---|---|
| CapTest Capacitor deterioration | 434 |
| Elec PwrFluctuations | 432 |
| Pitch ExternSafetyRun Input High TS5 Error | 430 |
| PitchAngle DifferenceStop | 412 |
| SFS Temperature Error Stop | 372 |
| SFS CrowbarCurrent LimitExceeded Stop | 371 |

*List of the 81 sensors related to the generator failure*

| generator | WTG_TurbineElectrical | WTG_Environment |
|---|---|---|
| TempG1L1 | ActivePower | WindSpeed |
| TempG1L2 | ReactivePower | WindSpeed1 |
| TempG1L3 | CurrentPhase1 | WindSpeed2 |
| TempG2L1 | CurrentPhase2 | WindSpeedDifference |
| TempG2L2 | CurrentPhase3 | WindDirection |
| TempG2L3 | CurrentAsymmetry | WindVane1 |
| TempBearingDe | VoltagePhase1 | WindVane2 |
| TempBearingNde | VoltagePhase2 | WindVaneDifference |
| TempIntermediateBearing | VoltagePhase3 | TempNacelle |
| RotationSpeed | GridFrequency | TempOutdoor |
| RotorSpeedDifference | AverageCurrentThreePhases | TempCabinetTopBox |
| FlexiSlipSetpoint | InsertedDate | TempBottomControlSection |
| TempFluidCoupling | Temp_UPSLvrt | TempBottomCapSection |
| FlexiSlipSpeedDifference | AI_intern_StatusPCS | TempBottomCapSection2 |
| FlexiSlipSpeedGenerator | AI_intern_ErrorPCS | TempBottomPowerSection |
| FlexiSlipCabinetTemp | AI_intern_RCS_ErrorWord1 | InsertedDate |
| RotorCurrentPhase1 | AI_intern_PCM_ReactivePwrSetpoint | TempBottomCapSection3 |
| InsertedDate | DFIG_GenSpeedInvActual | TempBottomCapSection4 |
| Temp_GenSlipRing | DFIG_TorqueActual | TempBottomCapSection5 |
| Temp_ResistorBox1 | MFR2_ActivePower | TempBottomDistributionSection |

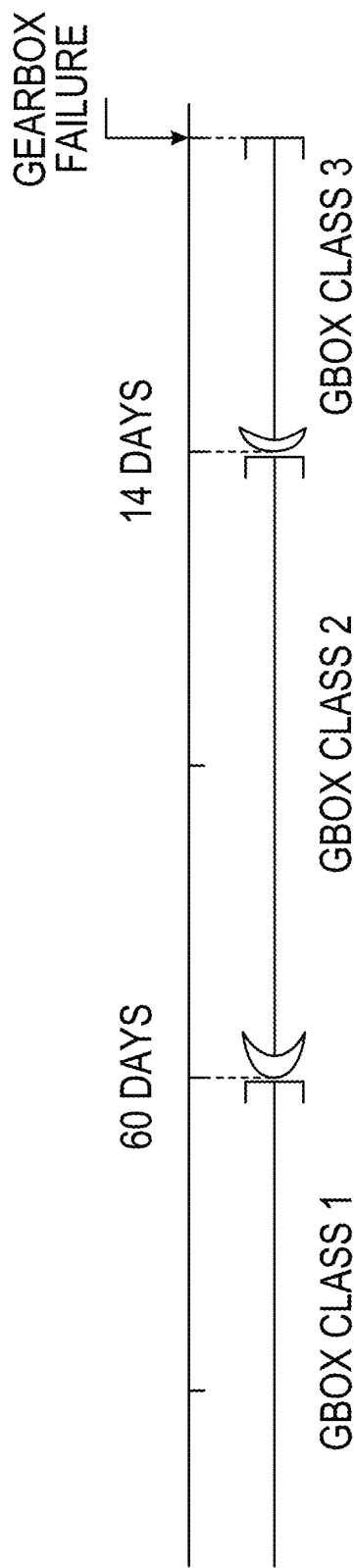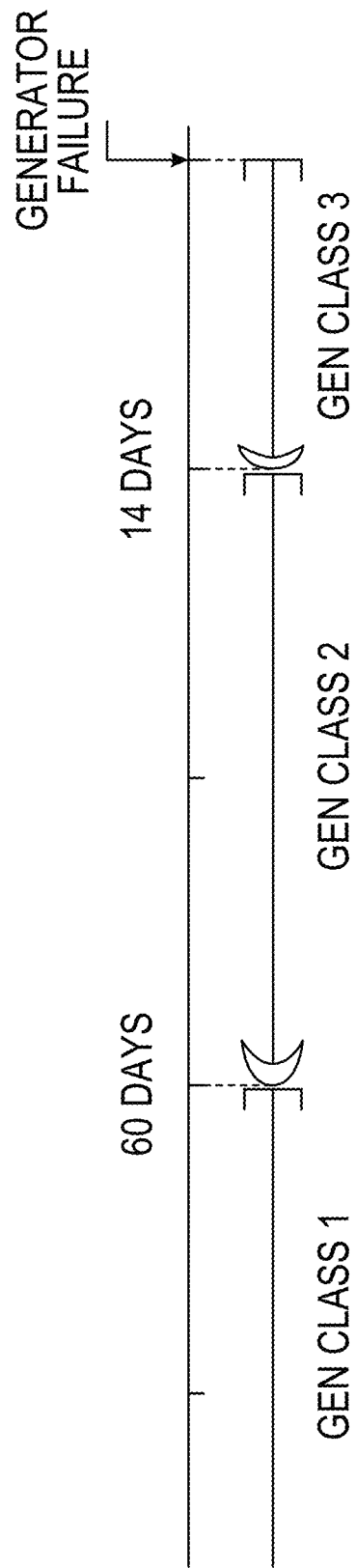
FIG. 17A
FIG. 17B

| EventDescription | EventCode | fid |
|---|---|---|
| Temp ControlPanel LowStop | 193 | 190 |
| Elec VoltageU1 HighStop | 194 | 191 |
| Elec VoltageU2 HighStop | 195 | 192 |
| Elec VoltageU3 HighStop | 196 | 193 |
| Elec VoltageU1 LowStop | 197 | 194 |
| Elec VoltageU2 LowStop | 198 | 195 |
| Elec VoltageU3 LowStop | 199 | 196 |
| Elec ParkControlActive | 201 | 197 |

FIG. 22

| Instance ID | FID: 0 | ... | FID: 190 | FID: 191 | ... |
|---|---|---|---|---|---|
| ... | | | | | |
| 28 | 3000 | | 29450 | 1234 | |
| 29 | 2401 | | 15000 | 2930 | |
| ... | | | | | |

SCALABLE SYSTEMS AND METHODS FOR ASSESSING HEALTHY CONDITION SCORES IN RENEWABLE ASSET MANAGEMENT

CROSS-REFERENCE TO RELATED APPLICATIONS

This application is a continuation of U.S. Nonprovisional patent application Ser. No. 17/133,591, filed on Dec. 23, 2020, entitled "Scalable Systems and Methods for Assessing Healthy Condition Scores in Renewable Asset Management," which claims priority to U.S. Provisional Patent Application No. 62/955,403, filed on Dec. 30, 2019, entitled "Scalable Systems and Methods for Assessing Healthy Condition Scores in Renewable Asset Management" both of which are incorporated herein by reference.

BACKGROUND

1. Field of the Invention(s)

Embodiments of the present invention(s) relate generally to forecasting failure of energy assets and, in particular, evaluating models to assess health conditions for renewable assets.

2. Related Art

Detection and prediction of failure in one or more components of an asset of an electrical network has been difficult. Detection of a failure of a component of an asset is tedious and high in errors. In this example, an asset is a device for generating or distributing power in an electrical network. Examples of assets can include, but are not limited to, a wind turbine, solar panel power generator, converter, transformer, distributor, and/or the like. Given that detection of a failure of a component of an asset may be difficult to determine, increased accuracy of prediction of future failures compounds problems.

SUMMARY

An example nontransitory computer readable medium comprises executable instructions. The executable instructions are executable by one or more processors to perform a method, the method comprising: receiving historical wind turbine component failure data and wind turbine asset data from the one or more SCADA systems during the first period of time, receiving first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, dividing a period of time into different classes to train failure prediction models for a first component using different lead times to create multi-class classifications, training a first set of failure prediction models using a deep neural network, the first historical sensor data and different lead times, the deep neural network including layers of a fully connected neural network, convolutional neural network, and a recurrent neural network to create a first set of failure prediction models, evaluating each of the first set of failure prediction models using at least a confusion matrix including metrics for true positives, false positives, true negatives, and false negatives as well as a positive prediction value, comparing by the model training and testing pipeline, the confusion matrix and the positive prediction value of each of the first set of failure prediction models, selecting at least one failure prediction model of the first set of failure prediction models based on the comparison of the confusion matrixes, the positive prediction values, and the lead time windows to create a first selected failure prediction model, the first selected failure prediction model including the lead time window before a predicted failure, receiving first sensor data of a second time period, the first sensor data including sensor data from the one or more sensors of the one or more components of the renewable energy asset, applying the first selected failure prediction model to the sensor data to generate a first failure prediction a failure of at least one component of the one or more components, comparing the first failure prediction to a trigger criteria, and generating and transmitting a first alert based on the comparison of the failure prediction to the trigger criteria, the alert indicating the at least one component of the one or more components and information regarding the failure prediction.

In various embodiments, the method further comprises performing a quality check and applying an availability filter to the historical sensor data. The method may, in some embodiments, further comprises detecting missing sensor data and replacing the missing sensor data with a linear interpolation or other data imputation methods.

In various embodiments, the method further comprises separating historical sensor data into training and validation based on failure events and the test set is separated based on time. The method may further comprise creating cohort instances based on the wind turbine failure data and wind turbine asset data, each cohort representing a subset of the wind turbines, the subset of the wind turbines including a same type of controller and a similar geographical location, the geographical location of the wind turbines of the subset of wind turbines being within the wind turbine asset data.

The method may further comprise generating an event and alarm that is vendor agnostic representation of event and alarm data creating a feature matrix, wherein the feature matrix includes a unique feature identifier for each feature of the event and alarm data and one or more features from the event and alarm data, and extracting patterns of events based on the feature matrix, the training the first set of failure prediction models using a deep neural network being further is based on the patterns of events.

The first set of failure prediction models may be assessed through a softmax function prior to evaluation. Extracting patterns of events may be based on the feature matrix comprises counting a number of event codes of events that occurred during a time interval using the feature matrix and sequence the event codes to include dynamics of events in a longitudinal time dimension. In some embodiments, each of the first set of failure prediction models predict failures of multiple components.

An example system may comprise at least one processor and memory containing instructions, the instructions being executable by the at least one processor to: receive historical wind turbine component failure data and wind turbine asset data from the one or more SCADA systems during the first period of time, receive first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, divide a period of time into different classes to train failure prediction models for a first component using different lead times to create multi-class classifications, train a first set of failure prediction models using a deep neural network, the first historical sensor data and different lead times, the deep neural network including layers of a fully connected neural network, convolutional neural network, and a recurrent neural network to create a first set of failure prediction models, evaluate each of the first set of failure prediction models using at least a confusion matrix including metrics for true positives, false positives, true negatives, and false negatives as well as a positive prediction value, compare by the model training and testing pipeline, the confusion matrix and the positive prediction value of each of the first set of failure prediction models, select at least one failure prediction model of the first set of failure prediction models based on the comparison of the confusion matrixes, the positive prediction values, and the lead time windows to create a first selected failure prediction model, the first selected failure prediction model including the lead time window before a predicted failure, receive first current sensor data of a second time period, the first current sensor data including sensor data from the one or more sensors of the one or more components of the renewable energy asset, apply the first selected failure prediction model to the current sensor data to generate a first failure prediction a failure of at least one component of the one or more components, compare the first failure prediction to a trigger criteria; and generate and transmit a first alert based on the comparison of the failure prediction to the trigger criteria, the alert indicating the at least one component of the one or more components and information regarding the failure prediction.

An example method comprises receiving historical wind turbine component failure data and wind turbine asset data from the one or more SCADA systems during the first period of time, receiving first historical sensor data of the first time period, the first historical sensor data including sensor data from one or more sensors of one or more components of the any number of renewable energy assets, the first historical sensor data indicating at least one first failure associated with the one or more components of the renewable energy asset during the first time period, dividing a period of time into different classes to train failure prediction models for a first component using different lead times to create multi-class classifications, training a first set of failure prediction models using a deep neural network, the first historical sensor data and different lead times, the deep neural network including layers of a fully connected neural network, convolutional neural network, and a recurrent neural network to create a first set of failure prediction models, evaluating each of the first set of failure prediction models using at least a confusion matrix including metrics for true positives, false positives, true negatives, and false negatives as well as a positive prediction value, comparing by the model training and testing pipeline, the confusion matrix and the positive prediction value of each of the first set of failure prediction models, selecting at least one failure prediction model of the first set of failure prediction models based on the comparison of the confusion matrixes, the positive prediction values, and the lead time windows to create a first selected failure prediction model, the first selected failure prediction model including the lead time window before a predicted failure, receiving first current sensor data of a second time period, the first current sensor data including sensor data from the one or more sensors of the one or more components of the renewable energy asset, applying the first selected failure prediction model to the sensor data to generate a first failure prediction a failure of at least one component of the one or more components, comparing the first failure prediction to a trigger criteria, and generating and transmitting a first alert based on the comparison of the failure prediction to the trigger criteria, the alert indicating the at least one component of the one or more components and information regarding the failure prediction.

An example non-transitory computer readable medium may comprise executable instructions. The executable instructions may be executable by one or more processors to perform a method. The method may comprise receiving historical wind turbine component failure data and wind turbine asset data from one or more SCADA systems during a first period of time, receiving first historical sensor data of the first period of time, the first historical sensor data including sensor data from one or more sensors of one or more components of any number of renewable energy assets, the first historical sensor data indicating at least one first failure associated with the one or more components of the renewable energy asset during the first time period, determining healthy assets of the any number of renewable energy assets by comparing one or more signals from the one or more SCADA systems to known healthy operating signals, training at least one machine learning model to indicate a first set of the one or more number of renewable energy assets that may potentially fail and to indicate a second set of the one or more number of renewable energy assets that are operating within a healthy threshold, receiving first sensor data of a second time period, the first sensor data including sensor data from the one or more sensors of the one or more components of the any number of renewable energy assets, applying the at least one machine learning model to the sensor data to generate a first failure prediction a failure of at least one component of the one or more components and to generate a list of renewable energy assets that are operating within a healthy threshold, comparing the first failure prediction to a trigger criteria, generating and transmitting a first alert if comparing the first failure prediction to the trigger criteria indicates a failure prediction, the alert indicating the at least one component of the one or more components and information regarding the failure prediction, and updating a list of renewable energy assets to perform surveillance based on the list of renewable energy assets that are operating within a healthy threshold.

The method may further comprise performing a quality check and applying an availability filter to the historical sensor data. The method may further comprise detecting missing sensor data and replacing the missing sensor data with a linear interpolation. In some embodiments, the method may further comprise separating historical sensor data into training and validation based on failure events and test set is separated based on time.

Determining healthy assets of the any number of renewable energy assets by comparing the one or more signals from the one or more SCADA systems to the known healthy operating signals may comprise performing power curve-based filtering and event log-based filtering. Performing power curve-based filtering and event log-based filtering may comprise comparing identifying an asset ID from the wind turbine asset data, retrieving an expected power curve, and comparing the expected power curve to a generated power curve received form the wind turbine asset data.

In some embodiments, training the at least one machine learning model may comprise training at least one failure prediction model to indicate the first set of the one or more number of renewable energy assets that may potentially fail and training a health prediction model to indicate the second set of the one or more number of renewable energy assets that are operating within a healthy threshold. The current sensor data may be applied to the health prediction model and if one or more renewable energy assets are operating within the health threshold, filtering the one or more renewable energy assets that are operating within the health threshold from current sensor data before applying remaining current sensor data to the failure prediction model.

Receiving the first current sensor data of the second time period may comprise receiving the first sensor data from current SCADA systems. In various embodiments, the method may further comprise generating an event and alarm that is vendor agnostic representation of event and alarm data creating a feature matrix, wherein the feature matrix includes a unique feature identifier for each feature of the event and alarm data and one or more features from the event and alarm data, and extracting patterns of events based on the feature matrix, the training the first set of failure prediction models using a deep neural network being further is based on the patterns of events.

An example component failure prediction system may comprise at least one processor and memory. The memory may contain instructions that are executable by the at least one processor to receive historical wind turbine component failure data and wind turbine asset data from one or more SCADA systems during a first period of time, receive first historical sensor data of the first period of time, the first historical sensor data including sensor data from one or more sensors of one or more components of any number of renewable energy assets, the first historical sensor data indicating at least one first failure associated with the one or more components of the renewable energy asset during the first time period, determine healthy assets of the any number of renewable energy assets by comparing one or more signals from the one or more SCADA systems to known healthy operating signals, train at least one machine learning model to indicate a first set of the one or more number of renewable energy assets that may potentially fail and to indicate a second set of the one or more number of renewable energy assets that are operating within a healthy threshold, receive first current sensor data of a second time period, the first current sensor data including sensor data from the one or more sensors of the one or more components of the any number of renewable energy assets, apply the at least one machine learning model to the current sensor data to generate a first failure prediction a failure of at least one component of the one or more components and to generate a list of renewable energy assets that are operating within a healthy threshold, compare the first failure prediction to a trigger criteria, generate and transmitting a first alert if comparing the first failure prediction to the trigger criteria indicates a failure prediction, the alert indicating the at least one component of the one or more components and information regarding the failure prediction, and update a list of renewable energy assets to perform surveillance based on the list of renewable energy assets that are operating within a healthy threshold.

An example method may comprise receiving historical wind turbine component failure data and wind turbine asset data from one or more SCADA systems during a first period of time, receiving first historical sensor data of the first period of time, the first historical sensor data including sensor data from one or more sensors of one or more components of any number of renewable energy assets, the first historical sensor data indicating at least one first failure associated with the one or more components of the renewable energy asset during the first time period, determining healthy assets of the any number of renewable energy assets by comparing one or more signals from the one or more SCADA systems to known healthy operating signals, training at least one machine learning model to indicate a first set of the one or more number of renewable energy assets that may potentially fail and to indicate a second set of the one or more number of renewable energy assets that are operating within a healthy threshold, receiving first current sensor data of a second time period, the first sensor data including sensor data from the one or more sensors of the one or more components of the any number of renewable energy assets, applying the at least one machine learning model to the sensor data to generate a first failure prediction a failure of at least one component of the one or more components and to generate a list of renewable energy assets that are operating within a healthy threshold, comparing the first failure prediction to a trigger criteria, generating and transmitting a first alert if comparing the first failure prediction to the trigger criteria indicates a failure prediction, the alert indicating the at least one component of the one or more components and information regarding the failure prediction, and updating a list of renewable energy assets to perform surveillance based on the list of renewable energy assets that are operating within a healthy threshold.

BRIEF DESCRIPTION OF THE DRAWINGS

FIG. 7 is an example of sensor data from a SCADA system.

FIG. 8a depicts an example event log.

FIG. 8b depicts example alarm metadata.

FIG. 11 is an example of a dataset when an 80% availability filter is applied over three years (2014 to 2017).

FIG. 17a depicts three classes across three periods of time for gearbox failure in one example.

FIG. 17b depicts three classes across three periods of time for generator failure in one example.

FIG. 22 depicts an example feature matrix generated by the data extraction module and/or the data preparation module in some embodiments.

FIG. 23 depicts an example longitudinal pattern extraction matrix that identifies for each instance identifier a number that each unique feature identifier occurs in a period of time.

FIG. 24 depicts example patterns that represent longitudinal patterns by distinct event sequences.

DETAILED DESCRIPTION

In the wind and solar generation industry, it is crucial to accurately forecast component failures with as much lead time as possible. Some embodiments described herein utilize machine learning algorithms to build a sophisticated forecasting model based on multi-variate sensor data to forecast component failures. There is typically a trade-off between accuracy of the forecast of component failure and the length of time forecasted (e.g., the predicted length of time) before the failure occurs. As a result, there is a need to generate multiple models for evaluation and standardize evaluation in order to obtain models that accurately predict failure at an acceptable length of time prior to the predicted failure. Various embodiments described herein overcome limitations of the prior art including scalability, proactive warnings, and computational efficiency while providing improved accuracy. The limitations of the prior art are often the limits of the technology at the time. Various embodiments described herein may pose solutions to those technological problems.

Wind turbines are complex systems that must be monitored intensively. Hundreds of sensors are used in Supervisory control and Data Acquisition (SCADA) condition monitoring systems of the wind turbines that continuously monitor the turbine, and thus produce an overwhelming amount of data. This big data demands specific tools and techniques to turn into actionable information. Current failure forecasting systems rely heavily on skilled persons to conduct feature engineering to extract meaningful features to feed into the forecasting system.

Preventive maintenance is the main motive for failure prediction. However, predicting failure with a fixed lead time does not provide sufficient information for the maintenance planning because planning for maintenance needs to be done ahead of time and must be prioritized and accelerated as the wind turbine approaches failure.

Further, data driven approaches for wind turbine failure prediction demand accurate failure time history which is often impossible to gain. The reason is that the wind turbine operators usually have loose a definition of failure. For example, operators typically decide when to shut down a wind turbine and log in a failure event.

Various embodiments of systems described herein may predict failure with varying lead time. The system may provide accurate information for different stages of maintenance planning. In some embodiments, systems described herein may automate feature engineering by taking advantage of deep learning methods. Moreover, a practical failure prediction system should tolerate inaccuracy in failure dates. Leveraging upon machine learning training techniques, some embodiments described herein are robust to noise in failure time history.

Figure 1:
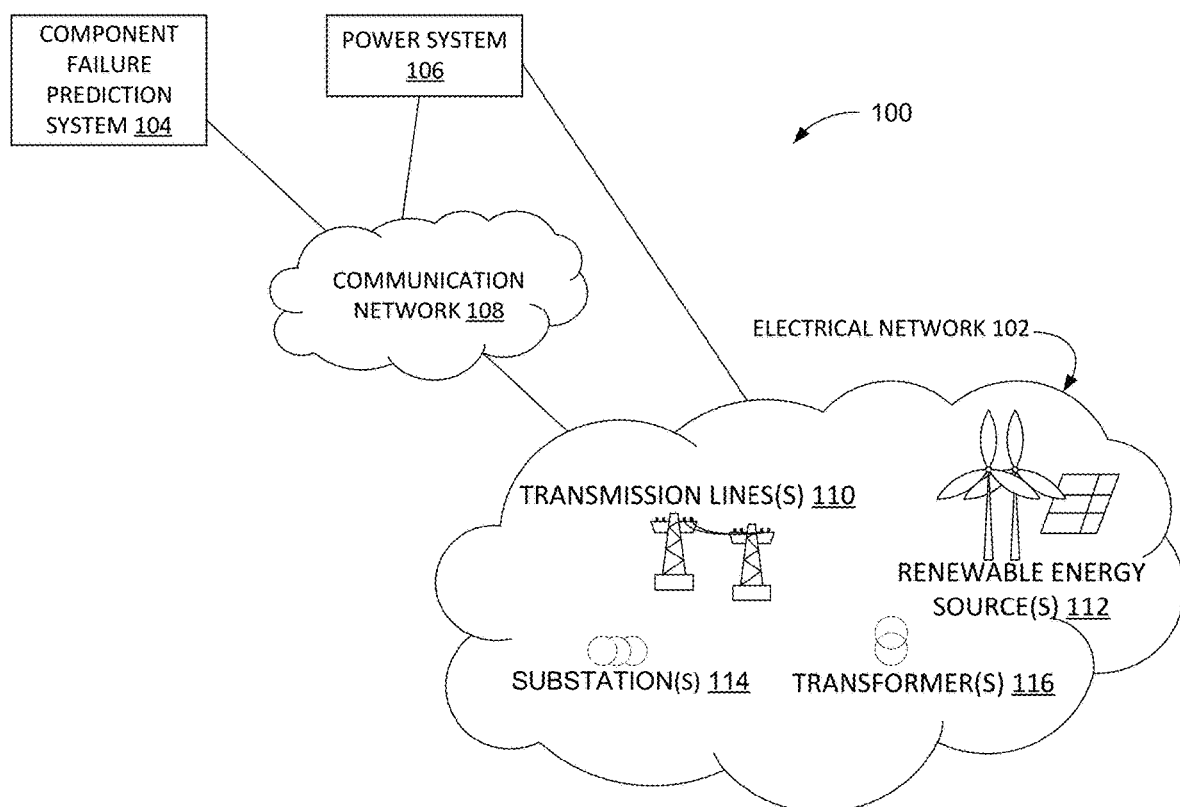
FIG. 1 depicts a block diagram of an example of an electrical network in some embodiments.

FIG. 1 depicts a block diagram 100 of an example of an electrical network 102 in some embodiments. FIG. 1 includes an electrical network 102, a component failure prediction system 104, a power system 106, in communication over a communication network 108. The electrical network 102 includes any number of transmission lines 110, renewable energy sources 112, substations 114, and transformers 116. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 110, the renewable energy source(s) 112, substation(s) 114, and/or transformer(s) 116 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each electrical asset of the electrical network 102 may represent one or more elements of their respective assets. For example, the transformer(s) 116, as shown in FIG. 1 may represent any number of transformers which make up electrical network 102.

In some embodiments, the component failure prediction system 104 may be configured to receive historical sensor data from any number of sensors of any number of electrical assets. The component failure prediction system 104 may subsequently generate any number of models to predict failures of any number of components. Different models for the same component(s) may be generated based on a common set of metrics.

Each model may be evaluated to determine accuracy of the model and the length of time prior to predicted failure at the desired level of accuracy. As such, the component failure prediction system 104 may be used to generate and evaluate multiple models using the same historical sensor data but each with different lengths of time prior to predicted failure in order to identify at least one model with an acceptable accuracy at an acceptable prediction time before component failure is expected to occur.

In some embodiments, communication network 108 represents one or more computer networks (e.g., LAN, WAN, and/or the like). Communication network 108 may provide communication between any of the component failure prediction system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The component failure prediction system 104 may include any number of digital devices configured to forecast component failure of any number of components and/or generators (e.g., wind turbine or solar power generator) of the renewable energy sources 112.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with the system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 29.

Figure 2:
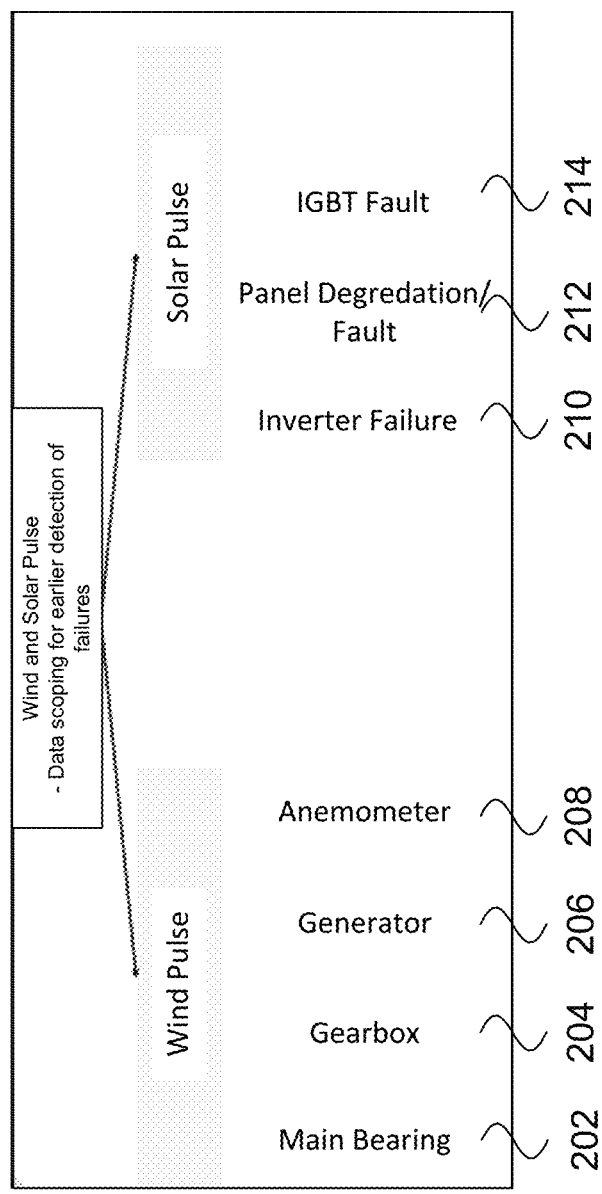
FIG. 2 depicts components that often produce failures of wind turbines and components that often produce failures in solar panel generators.

FIG. 2 depicts components that often produce failures of wind turbines and components that often produce failures in solar panel generators. Failures in wind turbines often occur as a result of failures in a main bearing 202 (e.g., a main bearing shaft), gearbox 204, generator 206, or anemometer 208. Failures in solar panel generators often occur as a result of failures in an inverter 210, panel 212 degradation, and an IGBT 214.

A wind turbine has many potential components of failure. Different sensors may provide different readings for one or more different components or combinations of components. Given the number of wind turbines in a wind farm, the amount of data to be assessed may be untenable using prior art methods. For example, data analytics systems of the prior art do not scale, are often overwhelmed by data from the sensors, and there is a lack of computational capacity to effectively assess data from wind farms in a time-sensitive manner. As a result, prior art systems are reactive to existing failures rather than proactively providing reports or warnings of potential future failure of one or more components.

Various embodiments regarding a wind turbine described herein may identify potential failure of a main bearing 202, gearbox 204, generator 206, or anemometer 208 of one or more wind turbines. Although many bearings may be utilized in a wind turbine (e.g., yaw and pitch bearings), the main shaft and gearbox of the wind turbine tend to be the most problematic. For example, a main bearing 202 may fail due to high thrust load or may fail due to inadequate lubricant film generation. Trends in redesign of a main bearing shaft 202 and/or gearbox 204 of a single wind turbine have been driven by unexpected failures in these units. The unplanned replacement of main bearing shaft 202 can cost operators up to $450,000 and have an obvious impact on financial performance.

Gearbox 204 failures are one of the largest sources of unplanned maintenance costs. Gearbox 204 failures can be caused by design issues, manufacturing defects, deficiencies in the lubricant, excessive time at standstill, high loading, and other reasons. There may be many different modes of gearbox 204 failure and, as such, it may be important to identify the type of failure mode in addressing the failure. One failure mode is micropitting which occurs when lubricant film between contacting surfaces in a gearbox 204 is not thick enough. Macropitting occurs when contact stress in a gear or breaking exceeds the fatigue strength of the material. Bending fatigue is a failure mode that affects gear teeth and axial cracking may occur in bearings of a gearbox; the cracks develop in the axial direction, perpendicular to the direction of rolling.

The generator 206 typically converts wind energy to electrical energy. Failures often occur in bearings, stator, rotor, or the like can lead to inconsistent voltage to total failure. Generator 206 failure may be difficult to detect as a result of inconsistent weather, lack of motion, and/or partial failure of the anemometer 208.

The anemometer 208 uses moving parts as sensors. Anemometers 208 often include "cups" for wind speed measurements and a wind vane that uses a "vane tail" for measuring vector change, or wind direction. Freezing weather has caused the cups and vane tail to lock. If an anemometer 208 under-reports wind speed because of a partial failure, there is an increase in rotor acceleration that indicates a large amount of wind energy is not being converted into electrical engineering. Rolling resistance in an anemometer 208 bearings typically increase over time until they seize. Further, if the anemometer 208 is not accurate, the wind turbine will not control blade pitch and rotor speed as needed. Poor or inaccurate measurements by the anemometer 208 will lead to incorrect adjustments and increased fatigue.

Similarly, various embodiments regarding a solar panel generator described herein may identify potential failure of a inverter 210, solar panel 212, and IGBT 214 in one or more solar panels of a solar farm.

A solar inverter 210 is an electrical converter to convert variable direct current from a photovoltaic solar panel 212 into a utility frequency alternating current that can be fed to an electrical grid. Production loses are often attributable to poor performance of inverters 210. Solar inventers 210 may overheat (caused by weather, use, or failure of cooling systems) which can reduce production. Moisture may cause a short circuit which can cause complete or partial failure (e.g., to a minimum required isolation level). Further, failure of the solar inverter 210 to restart after a grid fault may require manual restarting of the equipment.

The panel 212 refers to the solar or photovoltaic panel. The photovoltaic panel 212 may degrade due to weather, poor cleaning, thermal cycling, damp heat, humidity freezing, and UV exposure. Thermal cycling can cause solder bond failures and cracks. Damp heat has been associated with delamination of encapsulants and corrosion of cells. Humidity freezing can cause junction box adhesion to fail. UV exposure contributes to discoloration and backsheet degradation.

Solar inverters 210 often use insulated gate bipolar transistors (IGBT) 214 for conversion of solar panel 212 output to AC voltage. Failures in the IGBT 214 can be caused by fatigue, corrosion of metallizations, electromigration of metalizations, conductive filament formation, stress driven diffusion voiding, and time dependent dielectric breakdown. The application Ser. No. 16/234,455, filed Dec. 27, 2018, entitled "SCALABLE SYSTEM AND ENGINE FOR FORECASTING WIND TURBINE FAILURE" is incorporated herein by reference.

Figure 3:
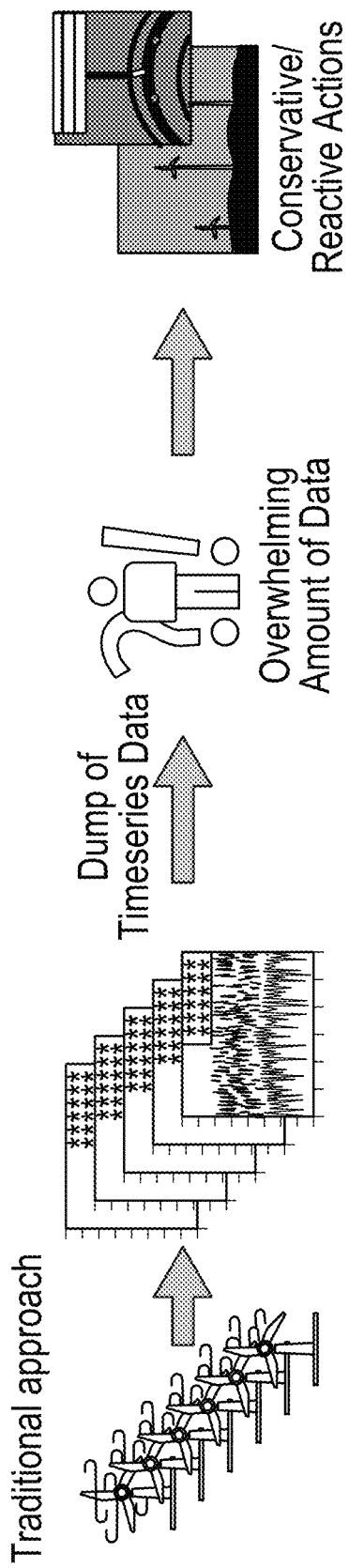
FIG. 3 depicts a common problem of detecting possible failure of one or more components of a wind farm.

FIG. 3 depicts a common problem of detecting possible failure of one or more components of a wind farm. As shown in FIG. 3, there may be any number of wind turbines in a wind farm. Sensors of each wind turbine in a wind farm may generate its own data. As a result, there is a dump of timeseries data which is overwhelming for prior art systems and prior art methods of assessment. As illustrated, monitoring hundreds of assets with hundreds of sensor inputs is time-consuming and overwhelming for operators to test. As a further consequence, evaluating different models for different components to predict failure in those components becomes difficult and accuracy can suffer as the desired time to predict component failure increases.

Existing prior art systems receive too much timeseries data to be effectively assessed in a scalable and/or computationally efficient manner. As a result, there is a conservative and reactive response to component and wind turbine failure. In other words, action is typically taken well after failure is detected or when failure is both immanent and unmistakable.

Figure 4:
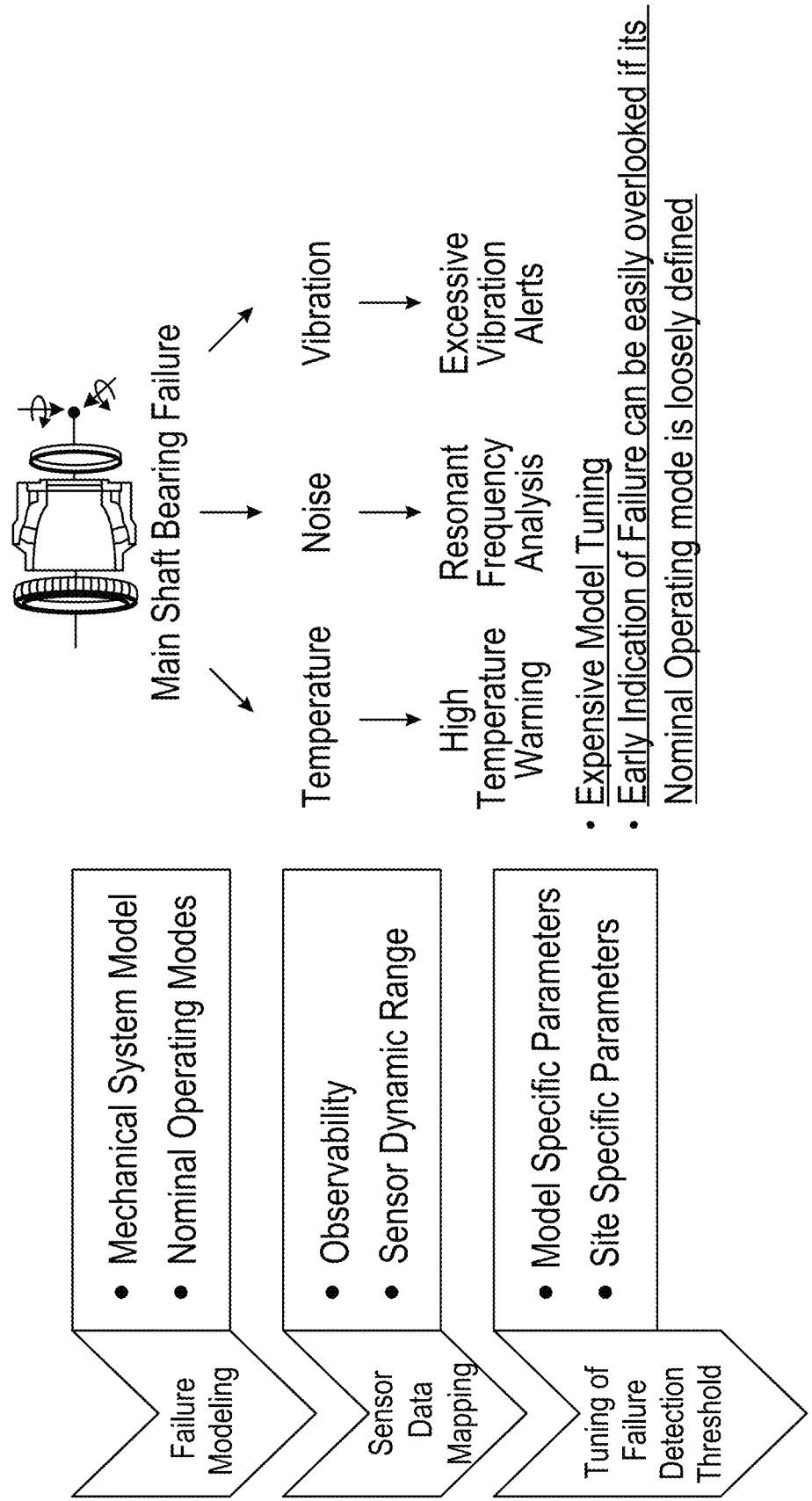
FIG. 4 depicts traditional failure prediction approaches of main bearing shaft failure in wind turbines as well as challenges.

FIG. 4 depicts traditional failure prediction approaches of main bearing shaft failure in wind turbines as well as challenges. In this example, main bearing shaft failure may be caused by any number of components. For prior art analysis, challenges include identifying the correct mechanical systems model and nominal operating modes of that mechanical system model.

Prior art approaches may also fail due to incorrect sensor data mapping. Mapping of sensor data may be based on observability and fail to account for sensor dynamic range. In one example of the main bearing shaft failure, sensor data regarding temperature, noise, and/or vibration may be taken into account. For example, the sensor data related to temperature, noise, and/or vibration is observed against the background of other sensor data readings, and the sensor dynamic range of each individual sensor or combination of sensors should be recognized.

Prior art systems often fail in tuning a failure detection thresholds for a sensor reading. Prior art systems typically identify model specific parameters and site-specific parameters. \

In this case, the temperature sensor data may indicate a high temperature warning relative to some high temperature threshold. The noise data may be utilized for resonant frequency analysis to detect residents within a component or device. The vibration data may be assessed to determine excessive vibration relative to some vibration threshold.

Further, early indication of failures in temperature, noise, vibration, or other failures, can be easily overlooked if the nominal operating mode is loosely defined by the prior art system.

Figure 5:
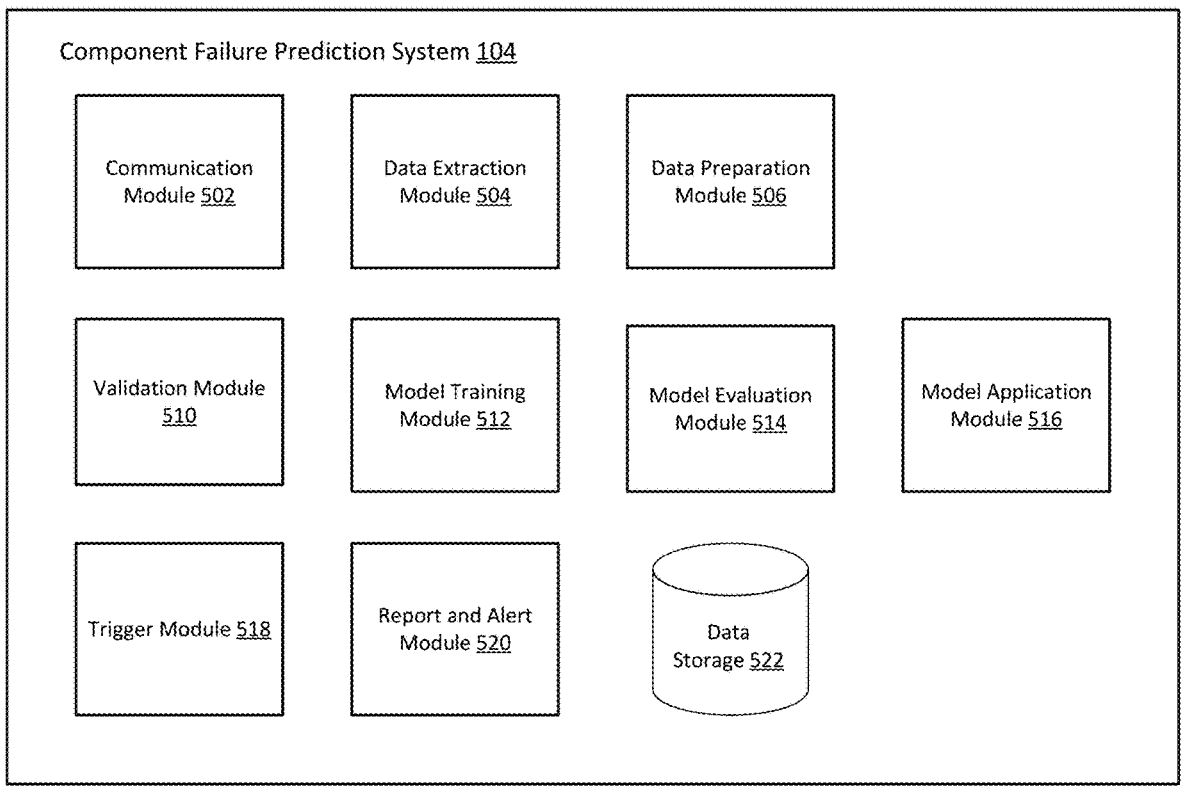
FIG. 5 is a block diagram of a component failure prediction system in some embodiments.

FIG. 5 is a block diagram of a component failure prediction system 104 in some embodiments. The component failure prediction system 104 may predict a component failure ahead of the actual failure. The component failure prediction system 104 may train and evaluate any number of models that predict component failure. In some embodiments, the component failure prediction system 104 trains a set of component failure prediction models for any number of components or set of components using historical sensor data received from sensors of any number of electrical assets (e.g., including renewable energy electrical assets such as wind turbines) on SCADA information (further discussed herein). In some embodiments, each set of models predicts failure of a set of components of the same or different electrical assets.

The component failure prediction system 104 may train different failure prediction models of a set using the same metrics from historical sensor data but with different lead times and with different amounts of historical sensor data (e.g., different amounts of lookback times). The component failure prediction system 104 may evaluate the failure prediction models of the set based on sensitivity, precision, and/or specificity for the different lookback and lead times. As a result, the component failure prediction system 104 may select a failure prediction model of a set of failure prediction models for each component type (e.g., bearing), component (e.g., specific bearing(s) in one or more assets), component group type (e.g., generator including two or more components), component group (e.g., specific generator(s) including two or more components in one or more assets), asset type (e.g., wind turbines), or group of assets (e.g., specific set of wind turbines).

Metrics used to evaluate performance (e.g., based on values from sensor readings and/or from the sensors themselves) may be the same for different components even if the sensor data from sensors of the different components is different. By standardizing metrics for evaluation, the component failure prediction system 104 may "tune" or change aspects of the failure prediction model and model training to accomplish the goals of acceptable accuracy with acceptable lead time before the predicted failure. This enable improved accuracy for different components of an electrical assets with improved time of prediction (e.g., longer prediction times is preferable).

In some embodiments, the component failure prediction system 104 may apply a multi-variate anomaly detection algorithm to sensors that are monitoring operating conditions of any number of renewable assets (e.g., wind turbines and or solar generators). The component failure prediction system 104 may remove data associated with a past, actual failure of the system (e.g. of any number of components and or devices), therefore highlighting subtle anomalies from normal operational conditions that lead to actual failures.

The component failure prediction system 104 may fine-tune failure prediction models by applying dimensionality reduction techniques to remove noise from irrelevant sensor data (e.g., apply principal component analysis to generate a failure prediction model using linearly uncorrelated data and/or features from the data). For example, the component failure prediction system 104 may utilize factor analysis to identify the importance of features within sensor data. The component failure prediction system 104 may also utilize one or more weighting vectors to highlight a portion or subset of sensor data that has high impact on the failure.

In some embodiments, the component failure prediction system 104 may further scope time series data of the sensor data by removing some sensor data from the actual failure time period. The component failure prediction system 104 may optionally utilize curated data features to improve the accuracy of detection. For example, regarding gearbox failure detection, there may be a temperature rise in the gearbox.

In some embodiments, the component failure prediction system 104 may receive historical sensor data regarding renewable energy sources (e.g., wind turbines, solar panels, wind farms, solar farms, electrical grants, and/or the like). The component failure prediction system 104 may break down the data in order to identify important features and remove noise of past failures that may impact model building. The historical data may be curated to further identify important features and remove noise. The component failure prediction system 104 may further identify labels or categories for machine learning. It will be appreciated that component failure prediction system 104 may, in some embodiments, identify labels.

The component failure prediction system 104 may receive sensor data regarding any number of components from any number of devices, such as wind turbines from a wind farm. The sensor data may include multivariate timeseries data which, when in combination with the labels or categories for machine learning, may assist for deep learning, latent variable mining, may provide insights for component failure indication. These insights, which may predict upcoming failures, may effectively enable responses to upcoming failures with sufficient lead time before failure impacts other components of energy generation.

It will be appreciated that identifying upcoming failures for any number of components and renewable energy generation may become increasingly important as sources of energy migrate to renewable energy. Failure of one or more components may impact the grid significantly, and as a result may put the electrical grid (and/or the legacy components of the electrical grid) either under burden or cause them to fail completely. Further, failures of the electrical grid and/or failures of renewable energy sources may threaten loss of property, business, and/or life particularly at times where energy is critical (e.g., hospital systems, severe weather conditions such as heat waves, blizzards, or hurricanes, care for the sick, care for the elderly, and/or care of the young).

The component failure prediction system 104 may comprise a communication module 502, a data extraction module 504, a data preparation module 506, a validation module 510, a model training module 512, a model evaluation module 514, a model application module 516, a trigger module 518, a report and alert module 520, and a data storage 522. Examples discussed herein are with regard to wind turbines but it will be appreciated that various systems and methods described herein may apply to any renewable energy asset (e.g., photovoltaic panels) or legacy electrical equipment.

Figure 6:
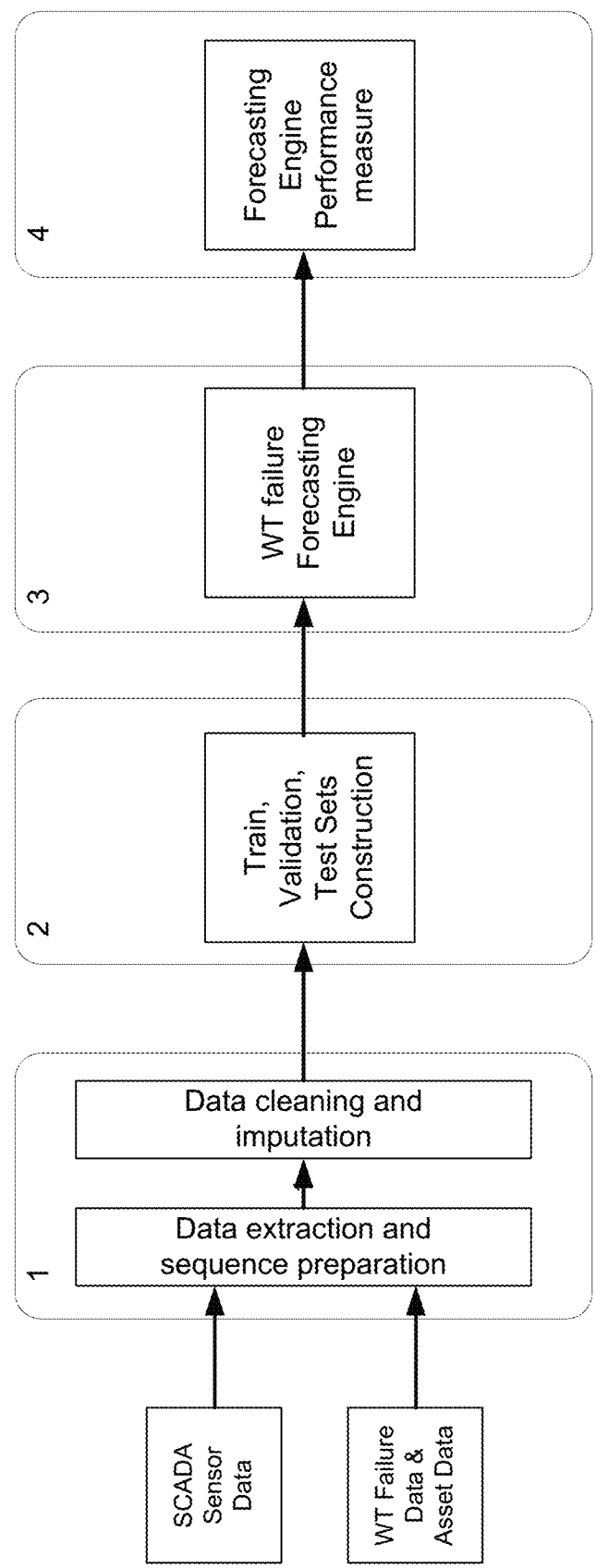
FIG. 6 depicts example phases of operation for failure prediction in some embodiments.

FIG. 6 depicts example phases of operation for failure prediction in some embodiments. Modules discussed regarding FIG. 5 will also be discussed in the context of FIG. 6.

The communication module 502 may be configured to transmit and receive data between two or more modules in the component failure prediction system 104. In some embodiments, the communication module 502 is configured to receive information regarding assets of the electrical network 102 (e.g., from the power system 106, sensors within components of the electrical network 102 such as the renewable energy sources 112, third-party systems such as government entities, other utilities, and/or the like).

The communication module 502 may be configured to receive failure data, asset data (e.g., WT failure data & asset data), sensor data, and SCADA information (See phase 1 of FIG. 6). Failure data may indicate failure of a component or combination of components.

Failure data may include but is not limited to a turbine identifier (e.g., TurbineId), failure start time (e.g., FailureStartTime), failure end time (e.g., FailureEndTime), component, subcomponent, part, comments, and/or the like. The turbine identifier may identify a wind turbine or group of wind turbines. A failure start time may be a time where a failure of a component, subcomponent, or part of the wind turbine begins. A failure end time may be a time where a failure of a component, subcomponent, or part of the wind turbine ends.

The wind turbine asset data may include, but is not limited to, wind turbine generation, mark version, geolocation, and/or the like. Wind turbine generation may indicate an amount of power being generated. A mark version may be a version of a component, subcomponent, part, or wind turbine. The geolocation may indicate the geographic location of a wind turbine or group of wind turbines. Sensor data may be from sensors of electrical assets either individually or in combination (e.g., wind turbines, solar panels, windfarms, solar farms, components of devices, components of wind turbines, components of solar panels, substations 114, transformers 116, and/or transmission lines 110). The communication module 502 may further receive sensor data from one or more sensors of any number of electrical assets such as those described above. The sensor data may, in some embodiments, be received by a SCADA system and provided by a SCADA system.

Supervisory control and Data Acquisition (SCADA) is a control system architecture often used to monitor and control aspects of hardware and software systems and networks. SCADA is one of the most commonly-used types of industrial control systems. SCADA may be used to provide remote access to a variety of local control modules which could be from different manufacturers which allows access through standard automation protocols. SCADA systems may be used to control large-scale processes at multiple sites and over large or small distances.

SCADA systems may be utilized for remote supervision and control of wind turbines and wind farms. For example, the SCADA system may enable control of any number of wind turbines in the wind farm (e.g., clusters of wind turbines, all wind turbines, or one wind turbine). The SCADA system may provide an overview of relevant parameters of each wind turbine including, for example, temperature, pitch angle, electrical parameters, rotor speed, yaw system, rotor velocity, azimuth angle, nacelle angle, and the like. The SCADA system may also allow remote access to the SCADA system to supervise and monitor any number of wind turbines of any number of wind farms.

The SCADA system may further log data regarding any number of the wind turbine such as failures, health information, performance, and the like. The SCADA system may allow access to the log data to one or more digital devices.

While examples of wind farms and wind turbines are discussed herein, it will be appreciated that SCADA systems may be utilized on any type of electrical asset or combination of different types of electrical assets including, for example, solar power generators, legacy electrical equipment, and the like.

SCADA system provide important signals for historical and present status of any number of wind turbines (WTs). However, an unmanageable number of alarms and event logs generated by a SCADA system is often ignored in wind turbine forecasting. Some embodiments of systems and method discussed herein leverages machine learning method(s) to extract a number of actionable insights from this valuable information.

SCADA sensors continuously monitor important variables of the wind turbine, environment, and the grid (e.g., temperature of various parts, active/reactive power generation, wind speed, rotation speed, grid frequency, voltage, current, and the like). The sensor data may be a multi-variant time series. FIG. 7 is an example of sensor data from a SCADA system.

The event and alarm logs may include, but are not limited to, a turbine identifier (e.g., turbineID), event code (e.g., EventCode), event type (e.g., EventType), event start time (e.g., EventStartTime), event end time (e.g., EventEndTime), component, subcomponent, and/or the like. The turbine identifier may be an identifier that identifies a particular wind turbine or group of turbines. An event code may be a code that indicates an event associated with performance or health of the particular wind turbine or group of turbines. The event type may be a classification of performance or health. An event start time may be a particular time that an event (e.g., an occurrence that affects performance or health) began and an event end time may be a particular time that the event ended. Components and subcomponents may include identifiers that identify one or more components or subcomponents that may be affected by the event.

The alarm metadata may include, but is not limited to, an event code (e.g., EventCode), description, and the like.

FIG. 8a depicts an example event log. The event log includes a turbine identifier, an event code number, a turbine event type, an event start time (e.g., EventStartUTC) which identifies a time of a beginning of an event using universal time, an event end time (e.g., EventEndUTC) which identifies a time of an ending of an event using universal time), description, turbine event identifier, parameter 1, and parameter two.

In this example, the same wind turbine is undergoing four different events, including a change in wind speed, a change in pitch, a remote power setpoint change, and a generator outage.

FIG. 8b depicts example alarm metadata. The event metadata example of FIG. 8b includes an event description and an event code. In various embodiments, the event metadata is not necessary for model development. In some embodiments, all or some of the event metadata may assist for model interpretation.

Figure 9:
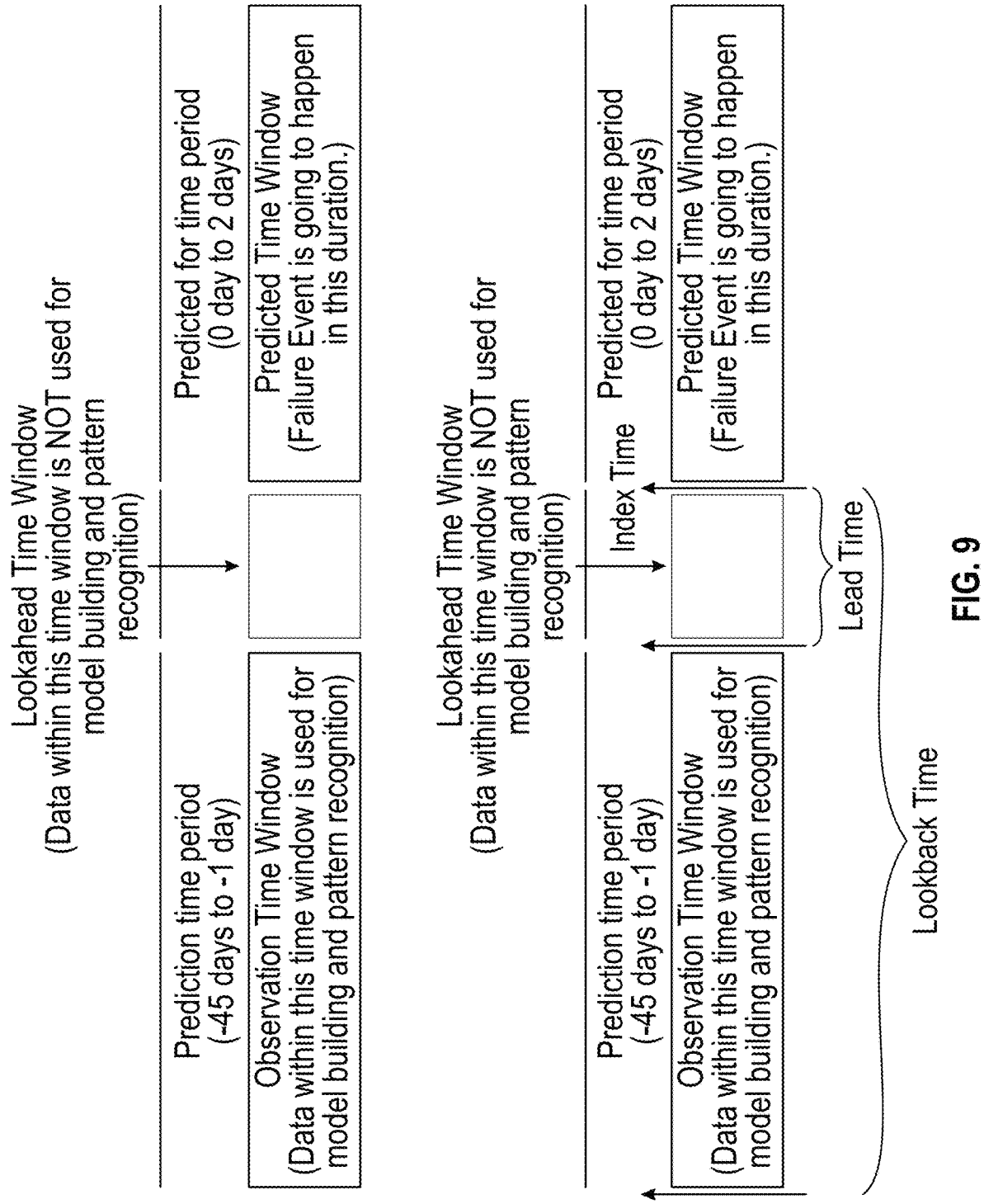
FIG. 9 characterizes problems and proposed solutions in some embodiments.

FIG. 9 characterizes problems and proposed solutions in some embodiments. The graph in FIG. 9 depicts sensor readings from multiple sensors over a period of time leading up to failure. The time before the failure is indicated as "lead time." One goal may be to improve lead time with sufficient accuracy such that alerts may be issued and/or actions taken to mitigate consequences of failure or avoid failure prior to that failure occurring.

FIG. 9 is also an example longitudinal evaluation framework for failure prediction. The longitudinal evaluation framework includes three periods of time, including a prediction time period, a lookahead time window, and a predicted for time period. In some embodiments, sensor data received and/or generated during the prediction time period may be used for model building and pattern recognition. Failure event labels may be extracted from the duration of the predicted time window.

The prediction time period is an observation time window where historical sensor data that was generated by sensors during this time window and/or received during this time window is used for failure prediction model building and pattern recognition for different models (e.g., with different amounts of lookback time). The lookahead time window is a period of time when sensor data generated during this time window and/or received during this time window is not used for model building and pattern recognition. In various embodiments, sensor data generated and/or received during the ahead time window may be used to test any or all failure prediction models. The predicted time window is a time period where failure is expected to happen.

In the example of FIG. 9, the prediction time period is −45 days to −1 day (prior to the lookahead time window) and the predicted time window is 0 to 2 days after the lookahead time window. Different failure prediction models may be generated with different amounts of prediction time periods (e.g., different models use a different number of days of sensor data) and different amounts of lookahead times (e.g., different models use a different number of days before predicted failure).

It will be appreciated that the predicted time period may be any length of time prior to the lookahead time window and that the predicted time window can be any length of time after the lookahead time window. One of the goals in some embodiments described herein is to achieve an acceptable level of accuracy of a model with a sufficient lead time before the predicted time window to enable proactive actions to prevent failure, to scale the system to enable detection of a number of component failures, and to improve the accuracy of the system (e.g., to avoid false positives).

Further, as used herein, a model training period may include a time period used to select training instances. An instance is a set of time series/event features along with the failure/non-failure of a particular component in a renewable energy asset (e.g., a wind turbine) in a specified time period. A model testing period is a time period used to select testing instances.

In phase 1 as depicted in FIG. 6, the data extraction module 504 extracts data and prepares sequences. The way data is extracted may have the advantage of making a better use of limited number of failure data.

The data extraction module 504 may extract data sequences from received data by means of a rolling observation window (e.g., rolling observation time window). Data instance contains sensor signals from an observation window. For example, if the observation window length is 15 days, then to predict the failure probability at time t, we need the sensors data from t−15 days up to time t. New data samples are generated by moving the observation window with a fixed stride value.

After extracting the data samples, the data preparation module 506 may clean the data to make it ready for feeding to a machine training model (e.g., one or more neural networks). There may be two types of missing values in SCADA sensor signals. The first type of missing values in SCADA sensor signals is when one sensor has missing values for the whole observation window or a portion within the observation window. In this case, the data preparation module 506 may impute the missing value by replacing that with the most similar available signal. For example, if the missing value is one of the voltage sensors, the data preparation module 506 replaces that with the voltage of other phases, or if the missing value is the temperature of a subcomponent, the data preparation module 506 replaces that with a temperature of a neighboring component.

Figure 10A:
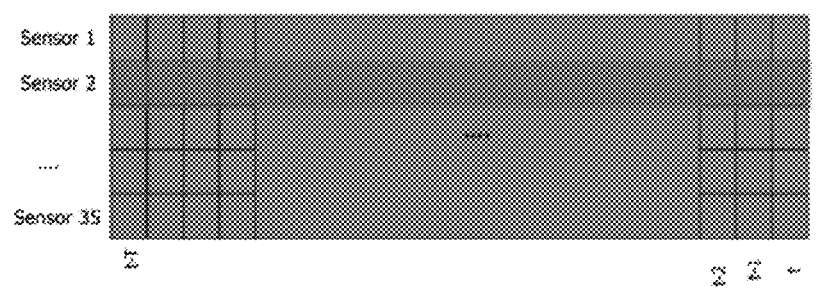
FIG. 10a is an example of sensor 2 missing values.

FIG. 10a is an example of sensor 2 missing values. In this example, the missing sensor is the voltage of phase 3. The data preparation module 506 replaces the missed values by voltage of phase 1.

The second type of missing values in SCADA sensor signals is when all sensors are missing values (probably as a result of communication loss). In one example of this case, the data preparation module 506 imputes the missing values by doing linear interpolation up to three time steps. The data preparation module 506 discards any data sample that still has a missing value after these two types of imputation.

Figure 10B:
FIG. 10b is an example of missing sensor values.

FIG. 10b is an example of missing sensor values. In this example, the data preparation module 506 imputes the missing values with linear interpolation up to 3 time steps. The data preparation module 506 may discard any instance with missing values after these 2 types of data imputation.

The data preparation module 506 may also, in some embodiments, perform a data quality check. For example, the data preparation module 506 may apply an 80% availability filter to sensor data to for sufficient data. FIG. 11 is an example of a dataset when an 80% availability filter is applied over three years (2014 to 2017). In FIG. 11, eighty one sensors are reduced to thirty five.

In FIG. 11, the dark gray sections are maintained while data sensor readings related to dark gray sections are retained.

The data preparation module 506 may also partition received data into training, validation, and test sets. The data preparation module 506 may partition received data into training, validation, and test sets based on failure events, in a way that the data points associated to one specific failure event stay only in one of the sets. In various embodiments, the data preparation module 506 is configured to keep the latest 20% of the failure events for the test set, and randomly partition the rest of them into training and validation sets with 3:1 ratio. It will be appreciated that any percentage may be used as well as any ratio.

Figure 12:
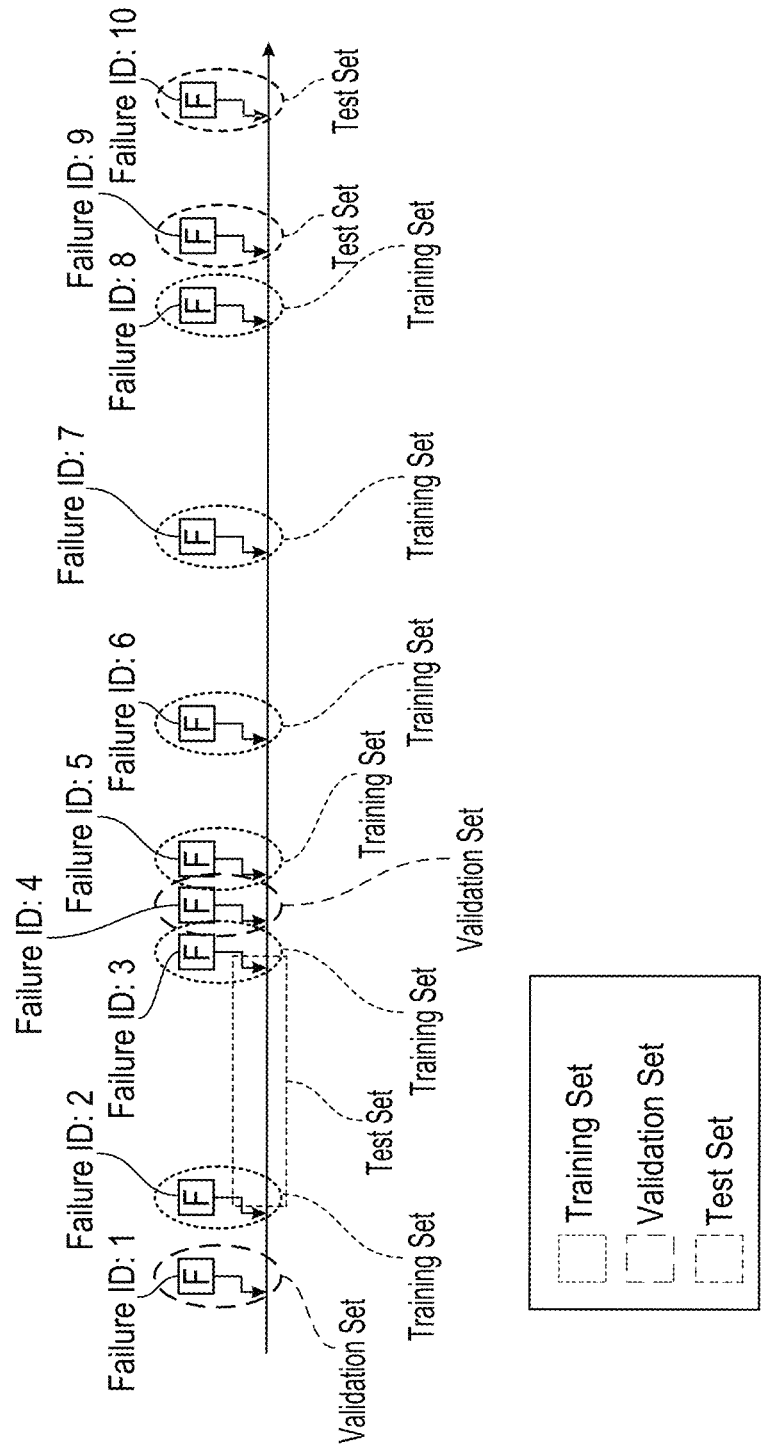
FIG. 12 is a simple illustration to further elaborate set partitioning in some embodiments.

FIG. 12 is a simple illustration to further elaborate set partitioning in some embodiments. The data extraction module 504 may optionally prepare the historical sensor data (sensor data over a past period of time) for training failure prediction modules. In various embodiments, the data extraction module 504 may extract features (e.g., dimensions and/or variables) from the received historical sensor data. The multivariate sensor data may, as discussed herein, be or include time series data. For example, the data extraction module 504 may extract features from the time series data. The data extraction module 504 may provide the extracted features to the validation module 510 and/or the model training module 512 for training and/or validating one or more failure prediction models.

In various embodiments, feature extraction may also refer to the process of creating new features from an initial set of data. These features may encapsulate central properties of a data set and represent the data set and a low dimensional space that facilitates learning. As can be appreciated, the initial multivariate sensor data may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data. It will be appreciated that, in some embodiments, dimensions may refer to columns (e.g., features or variables) of the received historical sensor data.

The model training module 512 may define the failure prediction problem as a multi-class classification problem. The model training module 512 may utilize varying lead time windows and provide for robust analysis even if there is an inaccurate failure date. The model training module 512 may utilize a deep neural network that has convolutional layers, recurrent layers, and feed forward layers.

The model training module 512 may utilize a neural network to predict failure with varying lead times. An authorized user or digital device may provide different lead times as necessary for technical remediation or lead times may be automated based on different durations of time.

In one example, the model training module 512 divides lead time into three different durations including, for example:
First period: Have at least two months till failure.
Second period: Have at least two weeks till failure.
Third period: Failure happens in the next two weeks.

Figure 13:
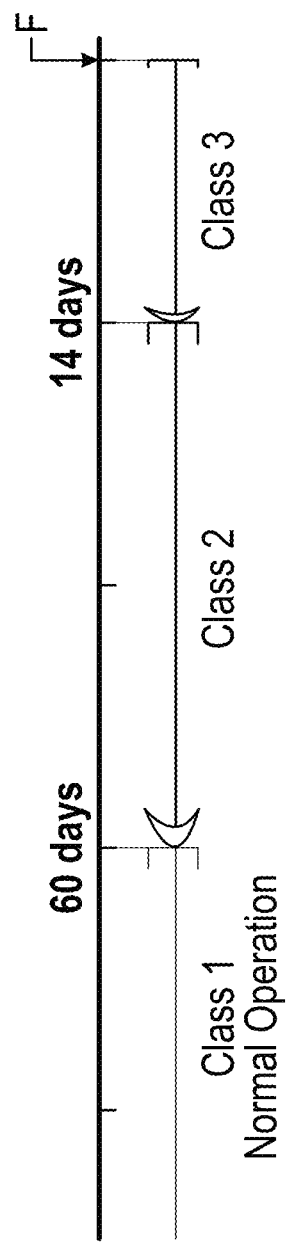
FIG. 13 depicts an example classification boundaries in an example.

FIG. 13 depicts an example classification boundaries in an example. In FIG. 12, class 1 of normal operation is until 60 days, class 2 is between 60 and 14 days, class 3 is between 14 days and failure.

Figure 14A:
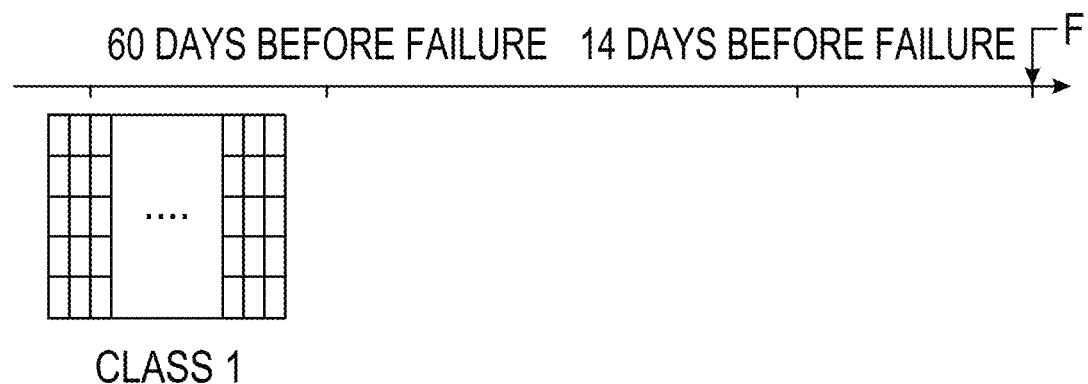
FIG. 14a depicts class 1 which is up to 60 days before failure in an example.
Figure 14B:
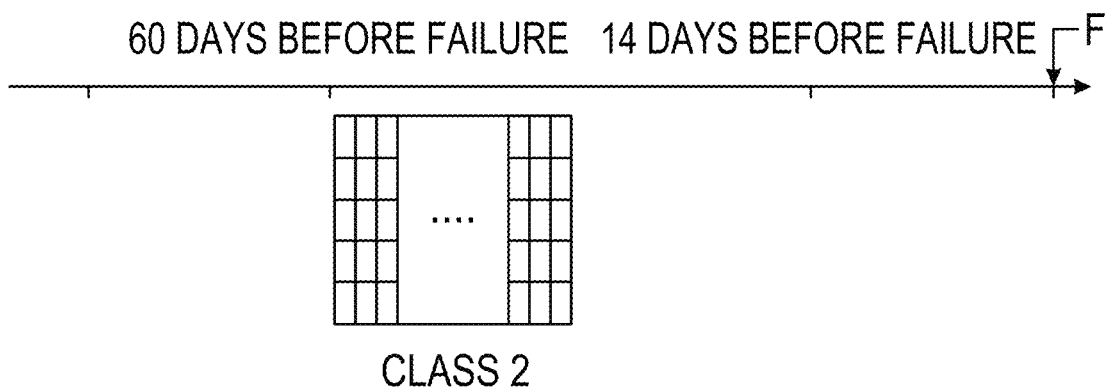
FIG. 14b depicts class 2 which is after 60 days before failure but before 14 days before failure in an example.
Figure 14C:
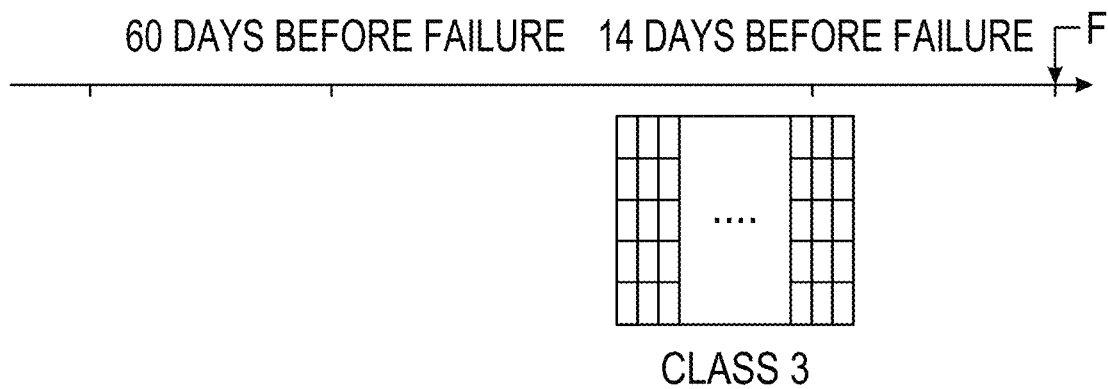
FIG. 14c depicts class 3 which is after class 2 and overlaps 14 days before failure in an example.

In order to train, the model training module 512 may label the data samples according to the amount of time they have to their associated failure. FIG. 14a depicts class 1 which is up to 60 days before failure in an example. FIG. 14b depicts class 2 which is after 60 days before failure but before 14 days before failure in an example. FIG. 14c depicts class 3 which is after class 2 and overlaps 14 days before failure in an example. To further this example, class 1 may be no failure in at least the next two months (RUL≥60 days), class 2 may be a failure to happen in 2 months to 2 weeks (14 days≤RUL<60 days), and class 3 may be a failure to happen in less than 2 weeks (0≤RUL<14 days). Class buckets may be chosen exponentially to reflect exponential nature of degradation process.

It will be appreciated that each class duration may be exclusive of each other. In some embodiments, the classes may overlap in time.

Figure 15:
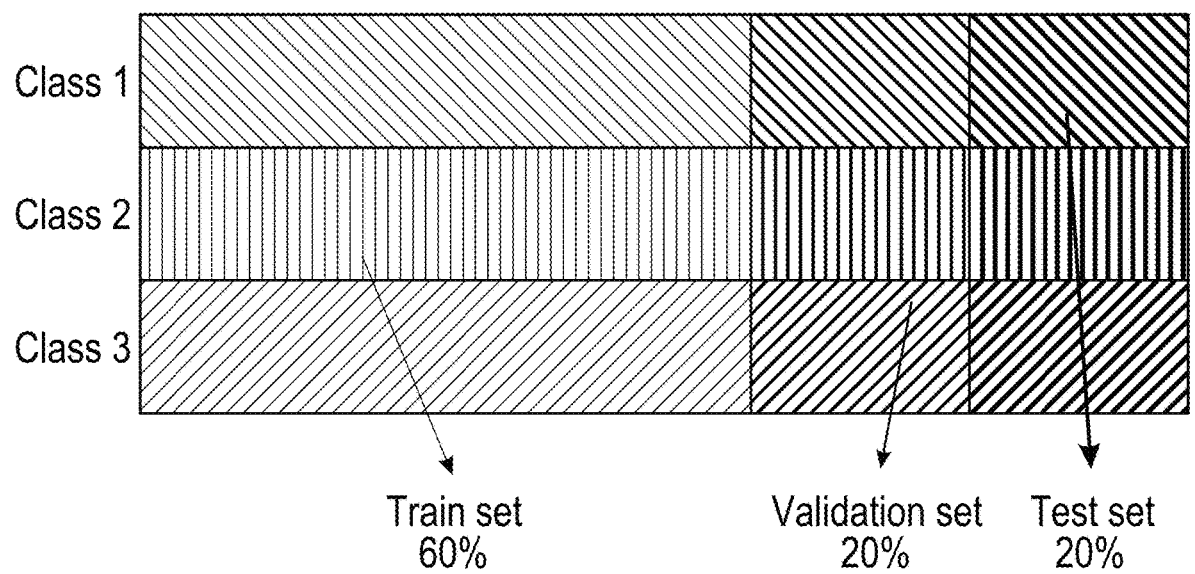
FIG. 15 further depicts division of the data into three exclusive sets for training, validation, and testing in some embodiments.

FIG. 15 further depicts division of the data into three exclusive sets for training, validation, and testing in some embodiments. FIG. 15 also includes the three classes discussed above. In various embodiments, for training, sets have a balanced number of samples from each class. The test set preferably mimics the real world and training is inclusive. Set partitioning is based on failure as discussed above.

The model training module 512 may utilize classification algorithms for model training. The classifications may include, for example, SVM, DeepLearning (such as CNN or CHAID). The training model input may include balanced input such as, for example, historical sensor data, extracted features from the historical sensor data, scoped anomaly time series from the historical sensor data and event data, scoped weighted sensor timeseries from the historical sensor data, and/or failure indications. In some embodiments, the timeseries data is a matrix where the start time the end time of the timeseries include maximum lead time, minimum lead time, and per desired time horizon (e.g., 45 days to 10 days before an event).

In various embodiments, the model training module 512 may utilize a deep neural network including three layers. For example, a failure forecasting method and system as discussed herein may leverage a combination of advantages of various deep learning methods (e.g., CNN, RNN) to maximize the utilization of limited failure instance data and to improve forecasting performance. This methodology may also address flexible and multiple-lead time windows in one developed model, which reflects more realistic component degradation process and provides more practical usage.

The three layers may include a fully connected neural network (FC), a convolutional neural network (CNN), and a recurrent neural network (RNN). The model training module 512 may also apply dropout techniques, gradient clipping, and batch normalization.

Figure 16:
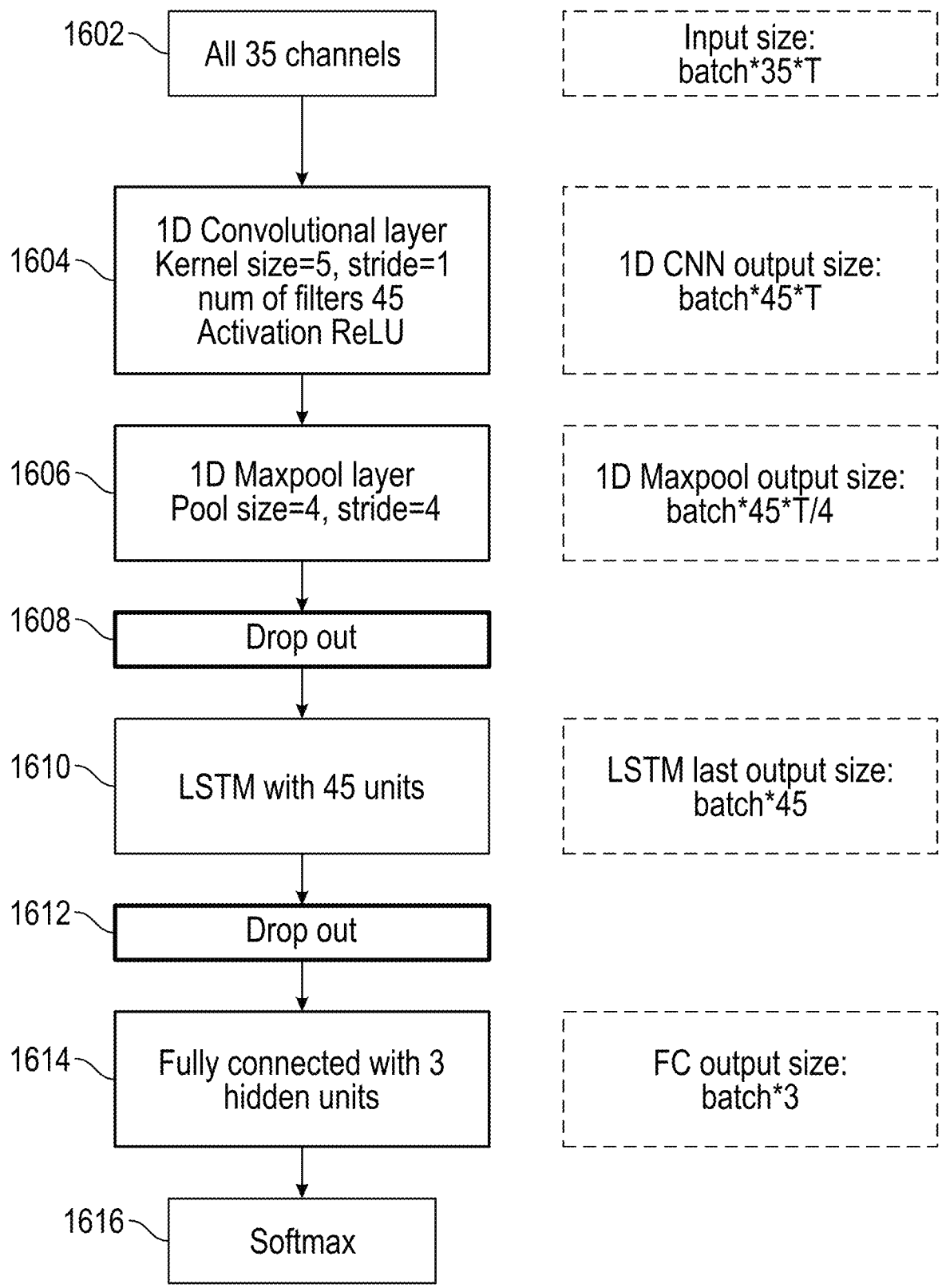
FIG. 16 is a flowchart using different layers of a fully connected neural network (FC), a convolutional neural network (CNN), and a recurrent neural network (RNN) in some embodiments.

FIG. 16 is a flowchart using different layers of a fully connected neural network (FC), a convolutional neural network (CNN), and a recurrent neural network (RNN) in some embodiments. In step 1602, the communication module 502 receives channels of data. For example, the communication module 502 may receive 35 channels of sensor data (e.g., from thirty five sensors identified in FIG. 11).

In step 1604, the model training module 512 may utilize the convolutional neural network (CNN) layer configured (in this example) with a kernel size of five, a stride of 1, number of filters 45 and rectified linear unit (ReLU) activation function. The ReLU may accelerate convergence of stochastic gradient descent. The output size in this example is batch*45*T (where T is time).

In step 1606, the model training module 512 may utilize max pooling configured (in this example) of a pool size of four and a stride of four. Max pooling is a sample-based discretization process with the objective of down-sampling an input representation thereby allowing for dimensionality reduction. The output of max pooling in this example is batch*45*T/4.

In step 1608, the model training module 512 may perform dropout techniques on the data received from max pooling. Dropout is a regularization technique for reducing overfitting in neural networks. The model training module 512 may drop out units (both hidden and visible).

In step 1610, the model training module 512 may utilize a long short-term memory (LSTM) network (e.g., as a recurrent network). LSTM networks are well-suited to classifying, processing, and making predictions based on time series data, since there can be lags of unknown duration between important events in a time series. The output size of the LSTM network in this example is batch*45.

In step 1612, the model training module 512 may again perform dropout techniques on the data received from max pooling.

In step 1614, the model training module 512 may utilize the fully connected neural network (FC) layer configured (in this example) with three hidden units. The output size of the FC in this example is batch*3.

In step 1616, the model training module 512 utilizes a softmax function to receive the output from the FC. The softmax function takes an un-normalized vector, and normalizes it into a probability distribution.

The model training module 512 may generate any number of failure prediction models using the historical sensor data and different configurations for lead time. For example, the model training module 512 may generate different failure prediction models of a set of failure prediction modules using different amounts of historical sensor data (e.g., historical sensor data generated over different time periods) and with different lead lookahead times. The model evaluation module 514 may evaluate any or all of the failure prediction models of each set generated by the model training module 512 to identify a preferred failure prediction model of a set in comparison to the other preferred failure prediction models of a set based on preferred criteria (e.g., longer lead times are preferred).

The model evaluation module 514 may evaluate the different failure prediction modules generated by the model training module 512. In various embodiments, the model evaluation module 514 applies macro-averaging of performance measures (e.g., accuracy, error rate, precision, recall, and the like).

In various embodiments, the model evaluation module 514 compares the predictions of each failure prediction model of a set of failure prediction models using historical sensor data to compare the results against ground truth (e.g., known failures and known periods of time that the component did not fail). The model evaluation module 514 may separate the outcomes into qualitative categories including true positives (TP), false positives (FP), true negatives (TN), false negatives (FN), positives (TP+FN), and negatives (TN+FP).

The model evaluation module 514 may utilize failure forecasting performance measures (e.g., standard metrics in any detection/classification model) to generate a confusion matrix. The metrics may include any or all of the following:

Confusion Matrix (FP,FN,TP,TN)
Receiver Operating Characteristics
Area Under the Curve
Predicted Failure->Failed: True Positive
Predicted Failure->Not Failed: False Positive
Predicted Non-failure->Not Failed: True Negative
Predicted Non-failure->Failed: False negative
Examples of the metrics may include the following:
Sensitivity, Recall, Hit Rate, or True Positive Rate (TPR):

$$TPR=TP/P=TP/(TP+FN)$$

Specificity or True Negative Rate (TNR)

$$TNR=TN/N=TN/(TN+FP)$$

Precision or Positive Predictive Value (PPV)

$$PPV=TP/(TP+FP)$$

Negative Predictive Value (NPV)

$$NPV=TN/(TN+FN)$$

Miss Rate or False Negative Rate (FNR)

$$FNR=FN/P=FN/(FN+TP)=1-TPR$$

Fall-out or False Negative Rate (FNR)

$$FPR=FP/N=FP/(FP+TN)=1-TNR$$

False Discovery Rate (FDR)

$$FDR=FP/(FP+TP)=1-PPV$$

False Omission Rate (FOR)

$$FOR=FN/(FN+TN)=1-NPV$$

Accuracy (ACC)

$$ACC=(TP+TN)/(P+N)=(TP+TN)/(TP+TN+FP+FN)$$

The F1 score is the harmonic mean of precision and sensitivity:

$$F_1 = 2 \cdot \frac{PPV \cdot TPR}{PPV + TPR} = \frac{2TP}{2TP + FP + FN}$$

The Matthews correlation coefficient (MCC) is:

$$MCC = \frac{TP \times TN - FP \times FN}{\sqrt{(TP+FP)(TP+FN)(TN+FP)(TN+FN)}}$$

The informedness or Bookmaker Informedness (BM) is:

$$BM=TPR+TNR-1$$

MK=PPV+NPV−1 The Markedness (MK) is

MK 32 PPV+NPV−1

In one example, the precision or positive predictive value of a failure prediction model may indicate that out of four alerts, three alerts are true failure cases and one alert is a false failure case which leads to 75% precision. In other words, if someone sends a crew based on this alarm, three times will result in preventative maintenance of any turbine downtime.

In various embodiments, the model evaluation module 514 determines a receiver operator characteristic area under the curve (ROC AUC) to assist in model performance evaluation. The Operating Characteristic Area Under the Curve is a measure of classifier performance in machine learning. When using normalized units, the area under the curve is equal to the probability that a classifier will rank a randomly chosen positive instance higher than a randomly chosen negative one (assuming 'positive' ranks higher than 'negative').

In various embodiments, the methodology may be extended to a multi-component forecasting method. The methodology may forecast multiple components of wind turbine simultaneously using one model, which is a more scalable way for model development and addresses the scenarios of multiple component degradation simultaneously in wind turbine life cycle.

Figure 17C:
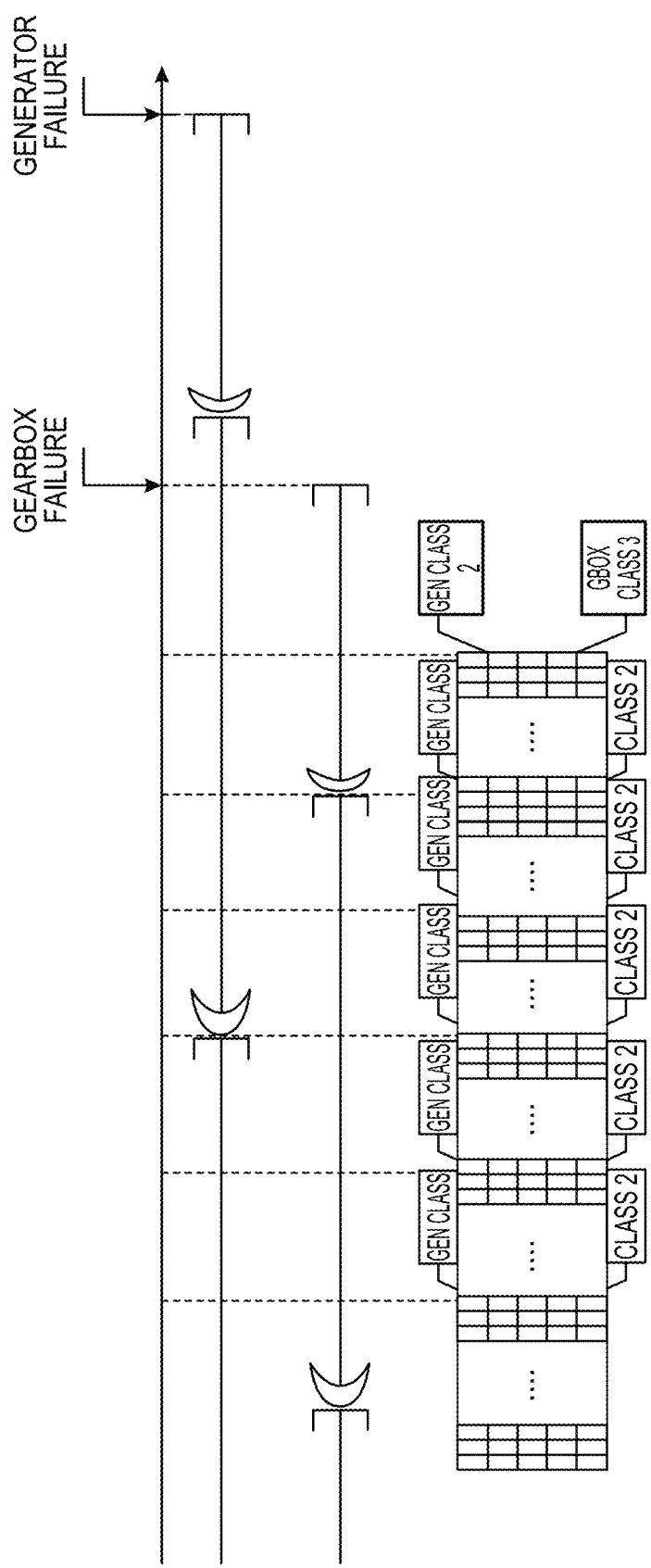
FIG. 17c depicts a combined timeline for gearbox and generator failure in one example.

FIG. 17a depicts three classes across three periods of time for gearbox failure in one example. FIG. 17b depicts three classes across three periods of time for generator failure in one example. FIG. 17c depicts a combined timeline for gearbox and generator failure in one example.

In some embodiments, instead of having three hidden units in the last layer (FC layer as discussed regarding FIG. 16), the model training module 512 may utilize a 3× number of components hidden units group each 3 hidden units and relate them to one component. The model training module 512 may pass each group through a softmax function and at the end calculate the cross entropy loss for each group and sum the losses.

Figure 18:
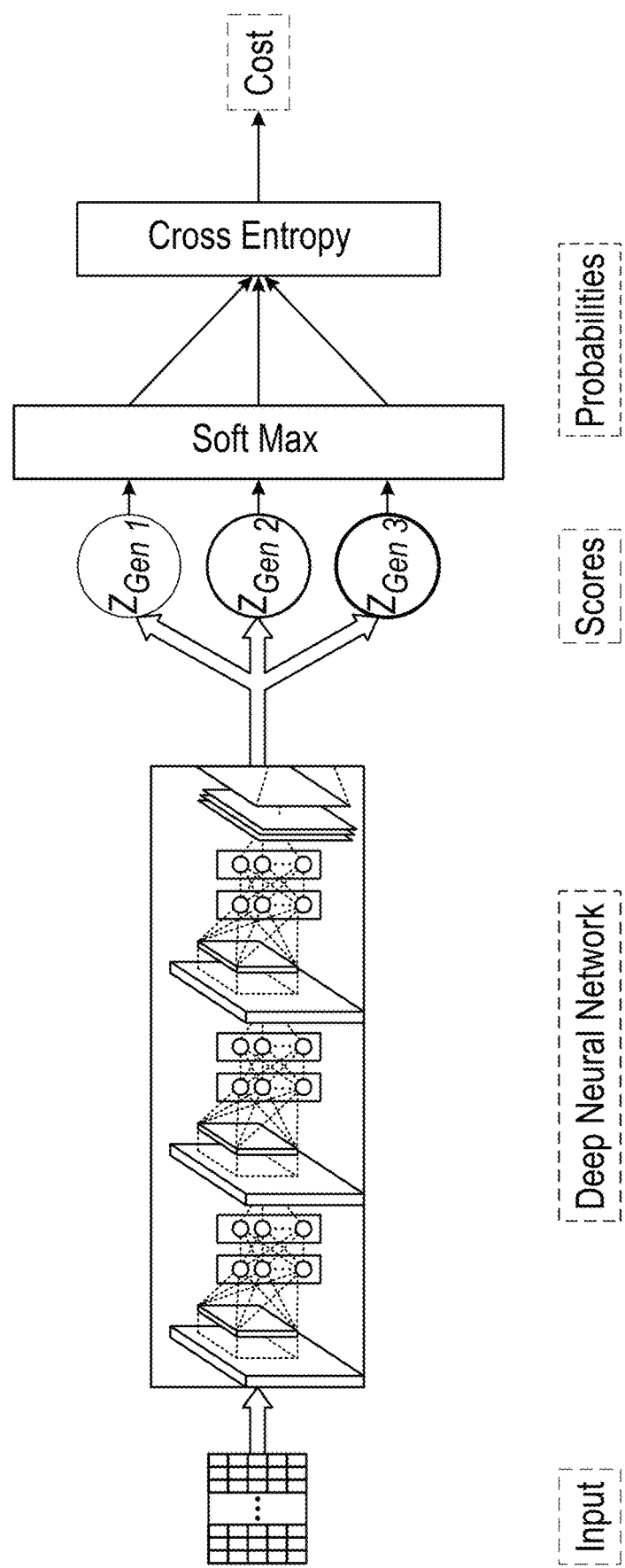
FIG. 18 depicts the methodology described herein for a single component method in some embodiments.

FIG. 18 depicts the methodology described herein for a single component method in some embodiments. Regarding FIG. 18, input may be received, data extracted, cleaned, processed, and trained with the deep neural network (CNN, RC, and FC). The three zscores for the different generations are passed through the softmax function and then through a cross entropy function.

Figure 19:
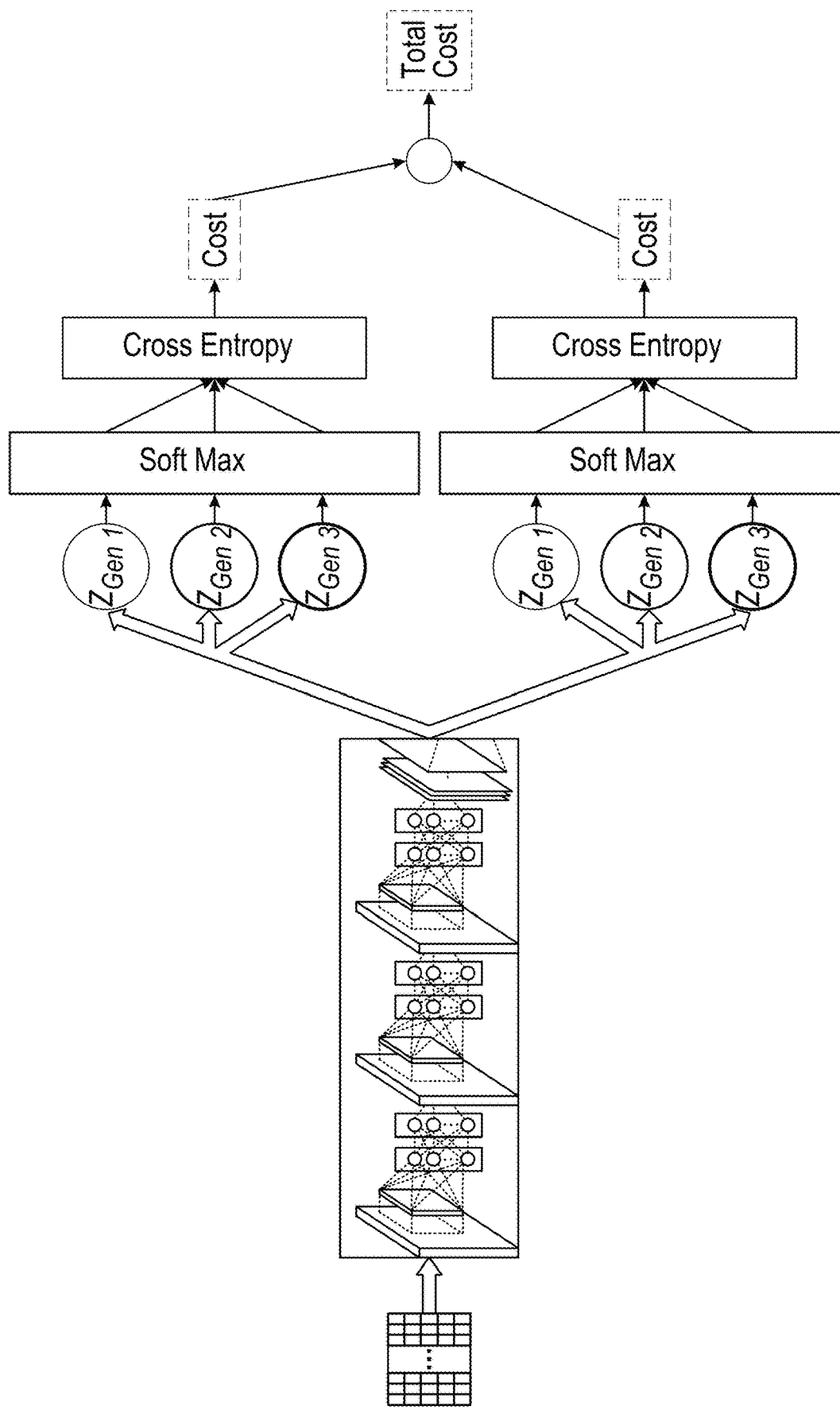
FIG. 19 depicts the methodology described herein for a two component method in some embodiments.

FIG. 19 depicts the methodology described herein for a two component method in some embodiments. Regarding FIG. 19, input may be received, data extracted, cleaned, processed, and trained with the deep neural network (CNN, RC, and FC). The six zscores for the different generations are passed through the softmax function(s) and then through the cross entropy function(s). A total cost may be generated.

The validation module 510 is configured to evaluate performance of the failure prediction models generated by the validation module 510. In some embodiments, the validation module 510 may perform x fold cross validation (CV) on training data sets to establish CV performance, including uncertainty of prediction. The validation module 510 may test the developed model on balanced testing data sets (e.g., about 50:50 (failed and non-failed systems) or to be tuned for the desired business outcome).

In various embodiments, the model application module 516 may compare new sensor data to classified and/or categorized states identified by the selected model to identify when sensor data indicates a failure state or a state associated with potential failure is reached. In some embodiments, the model application module 516 may score the likelihood or confidence of such a state being reached. The model application module 516 may compare the confidence or score against a threshold in order to trigger an alert or report. In another example, the model application module 516 may compare the fit of sensor data to a failure state or state associate with potential failure that has been identified by the model of the model application module 516 in order to trigger or not trigger an alert or report.

The trigger module 518 may establish thresholds for different components, component types, groups of components, groups of component types, assets, and/or asset types. Each threshold may be compared to an output of one or more selected models. Thresholds may be established based on the performance of the selected model in order to provide an alarm based on likelihood (e.g., confidence) of prediction, seriousness of fault, seriousness of potential effect of the fault (e.g., infrastructure or life threatened), lead time of fault, and/or the like.

It will be appreciated that there may be different categorized states identified during model training. Each categorized state may be associated with a different type of failure including mode of failure, component of failure, and/or the like.

The report and alert generation module 520 may generate an alert. An alert may be a message indicating a failure or type of failure as well as the specific renewable energy asset (e.g., wind turbine or solar panel) that may be at risk of failure. Since the state identified by the failure prediction model is a state that is in advance of a potential failure, the alert should be triggered in advance of the potential failure such that corrective action may take place. In some embodiments, different alerts may be generated based on different possible failure and or different failure states. For example, some failure states may be more serious than others, as such more alerts and/or additional detailed alerts may be provided to a larger number of digital devices (e.g., cell phones, operators, utility companies, service computers, or the like) depending on the seriousness, significance, and/or imminence of failure.

In some embodiments, the report and alert generation module 520 may generate a report indicating any number of potential failures, the probability of such failure, and the justification or reasoning based on the model and the fit of previously identified states associated with future failure of components.

The data storage 522 may be any type of data storage including tables databases or the like. The data storage 522 may store models, historical data, current sensor data, states indicating possible future failure, alerts, reports, and/or the like.

A module may be hardware (e.g., circuitry and/or programmable chip), software, or a combination of hardware and software.

Figure 20:
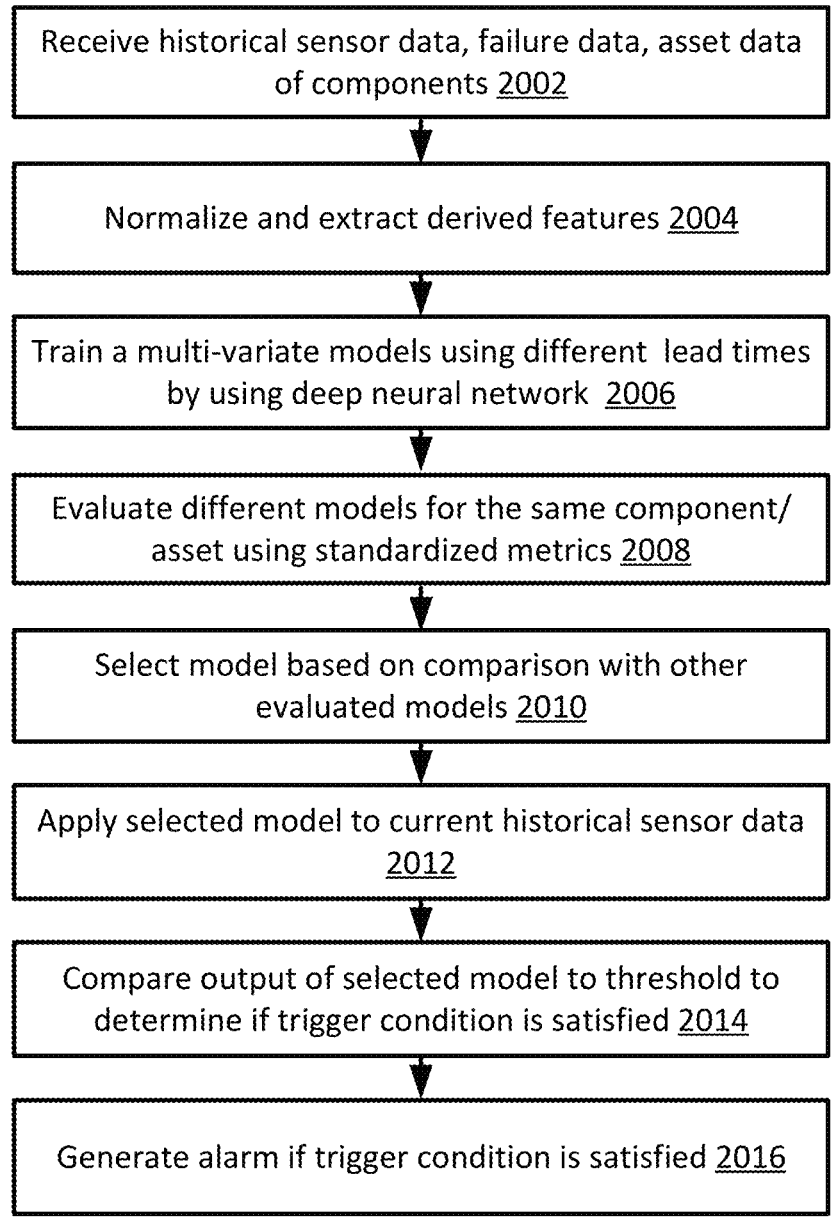
FIG. 20 is a flowchart for predicting failures and/or potential failures of renewable energy assets.

FIG. 20 is a flowchart for predicting failures and/or potential failures of renewable energy assets. In the example of FIG. 20, prediction failures and/or potential failures of wind turbines is discussed. In step 2002, the communication module 502 receives historical sensor data, failure data, and asset data of any number of components of any number of electrical assets. In various embodiments, the component failure prediction system may generate any number of different failure prediction models for a set of failure prediction models, each set of failure prediction models being for each component, component group, type of component, type of component group, and/or the like. Each set of failure prediction models of the set of failure prediction models may vary in terms of the observation window (e.g., limited to a predetermined window of the historical data used to train a model) and/or lead time. Some embodiments of extracting information from SCADA information is further discussed regarding FIG. 21.

In step 2004, the data extraction module 504 and the data preparation module 506 may normalize and/or extract features (e.g., derived or not derived) from the received historical sensor data and other received data. As discussed herein, the data extraction module 504 and the data preparation module 506 may perform a data quality check for a predetermined percentage of sensor data which may reduce the number of values to a subset of sensors that provided data to the component failure prediction system 104 during the relevant time period.

The data extraction module 504 and the data preparation module 506 may clean data by correcting for missing sensor data as discussed herein.

In various embodiments, the data extraction module 504 and the data preparation module 506 may define multiple lead time windows for different classes of lead time before an expected or actual failure (e.g., see three failure classes as discussed herein).

It will be appreciate that, in some embodiments, the data extraction module 504 and the data preparation module 506 may determine the observation window for a model to be trained, extract or receive the historical sensor data that was generated during the observation window, and reduce dimensionality of the data (e.g., using principal component analysis) and/or extract features (e.g., columns or metrics) from the historical sensor data to train one or more failure prediction models of the set.

The validation module 510 may cross validate any number of models. As discussed herein, any amount of the received data may be divided. In some embodiments, n sub-subsets of data may be divided for training and tested against another sub-subset of data (e.g., the data divided into five subsets where four are used for training and a fifth is used for testing). The process may continue to train different models using a different set of the subsets with a different subset used for training for cross validation and scaling.

In step 2006, the model training module 512 trains any number of failure prediction models with different classes of lead times by using a deep neural network (e.g., FC, CNN, and RNN utilizing drop out and max pooling). In some embodiments, step 2006 may be skipped if the failure prediction models are already trained (or have been trained within a predetermined period of time starting at the time of step 2002).

In step 2008, the model evaluation module 514 may evaluate every failure prediction model of a set of failure prediction models. For example, the model evaluation module 514 may evaluate every model that predicts failure of a generator of a wind turbine. Each model of the set may vary depending on the observation window and the lead time window used in generating the model.

The model evaluation module 514 may utilize standardized metrics as discussed herein to evaluate the models of the set of models. The model evaluation module 514 may utilize any or all of the following metrics including, but not limited to, Sensitivity, Recall, Hit Rate, or True Positive Rate (TPR), Specificity or True Negative Rate (TNR), Precision or Positive Predictive Value (PPV), Negative Predictive Value (NPV), Miss Rate or False Negative Rate (FNR), Fall-out or False Negative Rate (FNR), False Discovery Rate (FDR), False Omission Rate (FOR), Accuracy (ACC), the F1 score is the harmonic mean of precision and sensitivity, the Matthews correlation coefficient (MCC), the informedness or Bookmaker Informedness (BM), the Markedness (MK), and/or area under the curve (AUC).

In step 2010, the model evaluation module 514 may compare any number of the model evaluations of failure prediction models of a set of failure prediction models to any of the other set of model evaluations to select a preferred model of the set of models. It will be appreciated that each failure prediction model of a set may be compared using similar metrics and/or different metrics as described above. Based on the two different failure prediction models in this example, the model evaluation module 514 or authorized entity may select the failure prediction model with the longer lead time, higher AUC, train sensitivity, train precision, and train specificity even though the lookback time is larger.

In step 2012, the model application module 516 may receive current sensor data from the same components or group of components that provided the historical sensor data. The model application module 516 may apply the selected failure prediction model to the current sensor data to generate a prediction.

In step 2014, the trigger module 518 may compare the output of the selected failure prediction model to a threshold to determine if trigger conditions are satisfied 918. In other words, the trigger module 518 may compare a probability of accuracy or confidence of a predicted failure to a failure prediction threshold. In various embodiments, the trigger module 518 may store threshold triggers in a threshold trigger database. There may be different trigger thresholds for different components, component types, groups of components, groups of component types, assets, and/or asset types. In various embodiments, there may be different trigger thresholds depending on the amount of damage that may be caused to the asset by failure, other assets by failure, the electrical grid, infrastructure, property and/or life. There may be different trigger thresholds based on the selected model (e.g., based on sensitivity, accuracy, amount of lead time, predicted time of failure, and/or the like). The different trigger thresholds may be set, in some embodiments, by a power company, authorized individual, authorized digital device, and/or the like.

In step 2016, the report and alert generation module 520 may generate an alert if a trigger condition is satisfied. In some embodiments, the report and alert generation module 520 may have an alert threshold that must be triggered before the alert is issued. For example, the alert threshold may be based on the amount of damage that may be caused to the asset by failure, other assets by failure, the electrical grid, infrastructure, property and/or life. The alert may be issued by text, SMS, email, instant message, phone call, and/or the like. The alert may indicate the component, component group, type of component, type of component group, and/or the like that triggered the prediction as well as any information relevant to the prediction, like percentage of confidence and predicted time frame.

In various embodiments, a report is generated that may indicate any number of predicted failures of any number of components or groups of components based on an application of selected models to different sensor data which may enable the system to provide a greater understanding of system health.

Figure 21:
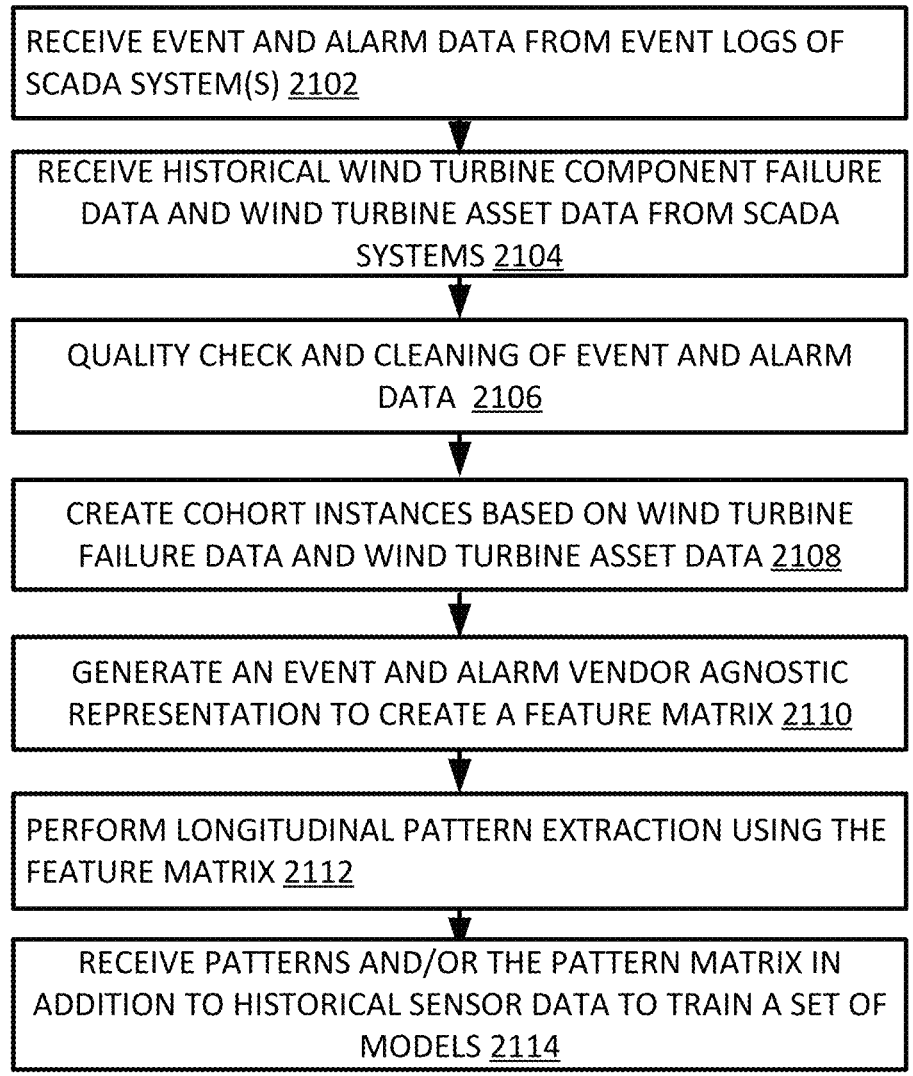
FIG. 21 is a flowchart for wind turbine failure forecasting using SCADA alarms and event logs in some embodiments.

FIG. 21 is a flowchart for wind turbine failure forecasting using SCADA alarms and event logs in some embodiments. While the flowchart in FIG. 21 addresses the use of SCADA alarm and event logs in conjunction with training multiple failure prediction models of a set of models, it will be appreciate that systems and methods described herein may utilize SCADA alarm and event logs in conjunction with training one or more failure prediction models (e.g., without training and evaluating failure prediction models of a set of failure prediction models to select a preferred model).

In step 2102, the data extraction module 504 may receive event and alarm data from one or more SCADA systems used to supervise and monitor any number of wind turbines. The data extraction module 504 may include an input interface to receive detailed event and alarm logs as well as event and alarm metadata. The event and alarm logs may include, but are not limited to, a turbine identifier (e.g., turbineID), event code (e.g., EventCode), event type (e.g., EventType), event start time (e.g., EventStartTime), event end time (e.g., EventEndTime), component, subcomponent, and/or the like. The turbine identifier may be an identifier that identifies a particular wind turbine or group of turbines. An event code may be a code that indicates an event associated with performance or health of the particular wind turbine or group of turbines. The event type may be a classification of performance or health. An event start time may be a particular time that an event (e.g., an occurrence that affects performance or health) began and an event end time may be a particular time that the event ended. Components and subcomponents may include identifiers that identify one or more components or subcomponents that may be affected by the event.

The alarm metadata may include, but is not limited to, an event code (e.g., EventCode), description, and the like. In one example, the event log includes a turbine identifier, an event code number, a turbine event type, an event start time (e.g., EventStartUTC) which identifies a time of a beginning of an event using universal time, an event end time (e.g., EventEndUTC) which identifies a time of an ending of an event using universal time), description, turbine event identifier, parameter 1, and parameter two.

In this example, the same wind turbine is undergoing four different events, including a change in wind speed, a change in pitch, a remote power setpoint change, and a generator outage.

Example event metadata example may include an event description and an event code. In various embodiments, the event metadata is not necessary for model development. In some embodiments, all or some of the event metadata may assist for model interpretation.

In step 2104, the data extraction module 504 may receive historical wind turbine component failure data and wind turbine asset metadata from one or more SCADA systems used to supervise and monitor any number of wind turbines. The data extraction module 504 may include an input interface to receive the historical wind turbine component failure data and the wind turbine asset data. The historical wind turbine component failure data may include but not be limited to a turbine identifier (e.g., TurbineId), failure start time (e.g., FailureStartTime), failure end time (e.g., FailureEndTime), component, subcomponent, part, comments, and/or the like. The turbine identifier may identify a wind turbine or group of wind turbines. A failure start time may be a time where a failure of a component, subcomponent, or part of the wind turbine begins. A failure end time may be a time where a failure of a component, subcomponent, or part of the wind turbine ends.

The wind turbine asset data may include, but is not limited to, wind turbine generation, mark version, geolocation, and/or the like. Wind turbine generation may indicate an amount of power being generated. A mark version may be a version of a component, subcomponent, part, or wind turbine. The geolocation may indicate the geographic location of a wind turbine or group of wind turbines.

In step 2106, the data extraction module 504 and/or the data preparation module 506 may conduct basic event data quality checks such as, but not limited to: daily availability check (e.g., minimum number of daily event code counts), event code option check (e.g., non-recognizable event), timestamp availability check, and/or the like. The data extraction module 504 and/or the data preparation module 506 may also conduct cleaning based on defined business rules (e.g. discard event data without start timestamp, and/or the like).

In step 2108, the data extraction module 504 and/or the data preparation module 506 may generate or extract cohorts for model development. A cohort may be a set of wind turbines having the same controller type and operating in a similar geography. In one example, example, the data extraction module 504 and/or the data preparation module 506 identifies similar or same controller types based on the asset data and the geolocation to generate any number of cohorts.

The data extraction module 504 and/or the data preparation module 506 may also identify both healthy time window WT instances and component failure time window WT instances from the failure data for any number of components, subcomponents, parts, wind turbines, and/or.

In step 2110, the data extraction module 504 and/or the data preparation module 506 may generate an event and alarm vendor agnostic representation. In various embodiments, the data extraction module 504 and/or the data preparation module 506 receives the event and alarm logs as well as event and alarm metadata. In one example, data extraction module 504 and/or the data preparation module 506 may check whether the event and alarm logs as well as event and alarm metadata conform to standardized input interfaces.

The data extraction module 504 and/or the data preparation module 506 may modify the event and alarm log data from the event and alarm log and/or the alarm metadata to represent the event and alarm data in a vendor agnostic and machine readable way (e.g., by structuring the event and alarm log data).

FIG. 22 depicts an example feature matrix generated by the data extraction module 504 and/or the data preparation module 506 in some embodiments. The example feature matrix includes an event description, event code, and an unique feature identifier. In some embodiments, a benefit of the method of generating a feature matrix is that information from the event and alarm log is structured and organized in a manner that is wind turbine manufacturer and generator independent.

For example, the data extraction module 504 and/or the data preparation module 506 may assign each event code a unique feature identifier (FID). The identifier may be used as a column index in a feature matrix. In various embodiments, the data extraction module 504 and/or the data preparation module 506 extracts information from the event and alarm log and the alarm metadata, assigns a unique feature identifier, and generates the feature matrix.

In various embodiments, the data extraction module 504 and/or the data preparation module 506 parses information from the event and alarm log data and/or alarm metadata to generate one or more feature matrixes. In some embodiments, the data extraction module 504 and/or the data preparation module 506 may utilize different templates associated with different SCADA outputs to parse the information and generate the feature matrix(es) to structure the data.

In step 2112, the data extraction module 504 and/or the data preparation module 506 may mine and discover patterns among the event and alarm data in the longitudinal history (e.g., patterns may be as simple as unique event code counts in a past time period such as a month, advanced time sequence patterns such as A->B->C, or complicated encoded event sequence vectors). In various embodiments, the data extraction module 504 and/or the data preparation module 506 may utilize the feature matrix(es) to discover patterns. The data extraction module 504 and/or the data preparation module 506 may provide the discovered patterns to other components of the component failure prediction system 104.

The data extraction module 504 and/or the data preparation module 506 may perform longitudinal pattern extraction by counting a number of each event code that happened during a certain time interval (e.g., based on the observation time window).

FIG. 23 depicts an example longitudinal pattern extraction matrix that identifies for each instance identifier a number that each unique feature identifier occurs in a period of time. For example, unique feature identifier 0 occurs 3000 for instance identifier 28, and unique feature identifier 190 occurs 29,450 for instance identifier 28 during the same period of time.

Figure 24:
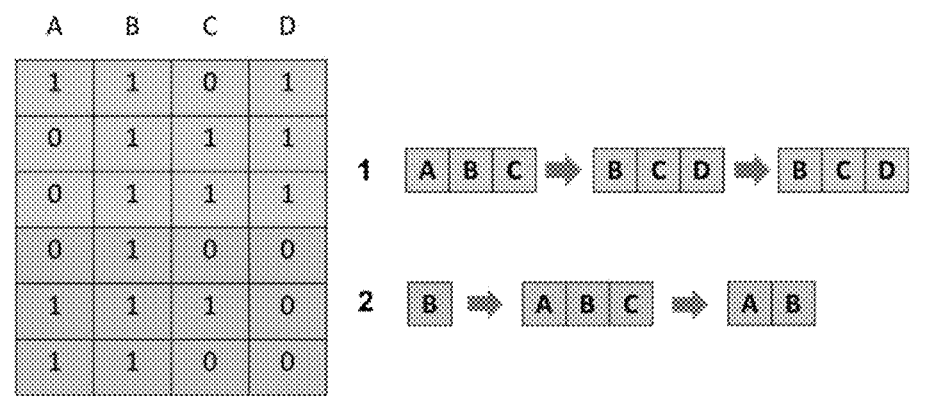

The data extraction module 504 and/or the data preparation module 506 may then count a number of each event code that occurred during the period of time and sequence events. FIG. 24 depicts example patterns that represent longitudinal patterns by distinct event sequences.

In various embodiments, the data extraction module 504 and/or the data preparation module 506 provides the capability to consider dynamics of event codes in a longitudinal time dimension which may include important features for wind turbine failure forecasting and may be impractical to extract from operational signals.

In some embodiments, the data extraction module 504 and/or the data preparation module 506 extracts information from the event and alarm log for a first time period, the alarm metadata for the same first time period, weather turbine failure data for the same first time period, and cohorts in generating the feature matrix.

In step 2114, the model training module 512 of FIG. 5 may receive patterns and/or the pattern matrix in addition to historical sensor data to train a set of failure prediction models. As discussed herein, each set of failure prediction models may be for a component, set of components, or the like.

In various embodiments, the model training module 512 may also receive features extracted from operational signals of one or more SCADA systems. In some embodiments, a SCADA operational signal module (not depicted) may receive any number of operational signals regarding one or more SCADA systems. A longitudinal SCADA feature extraction module (not depicted) may optionally extract operational features from the operational signals and provide them to the model training module 512 to be utilized in addition to the patterns and/or the pattern matrix in addition to historical sensor data to train the set of models.

By leveraging SCADA logs and metadata using agnostic representations to derive patterns useful in machine learning, the failure prediction models may improve for accuracy and scalability. It will be appreciated that the event logs, alarm information, and the like generated by SCADA may reduce processing time for model generation thereby enabling multiple failure prediction models to be generated in a timely matter (e.g., before the historical sensor data becomes scale) enabling scaling of the system yet with improved accuracy. It will be appreciated that generating a different failure prediction model for different components or groups of components of a set of wind turbines is computationally resource heavy and thereby may slow the process of model generation. This problem is compounded when creating a set of failure prediction models for each of the different components or groups of components of a set of wind turbines and evaluating different observation windows and lead times to identify preferred failure prediction models with better accuracy at desired lead times.

It will be appreciated that systems and methods described herein overcome the current challenge of using SCADA logs and metadata from different sources and utilizing the information to improve scalability and improve accuracy of an otherwise resource-intensive process, thereby overcoming a technological hurdle that was created by computer technology.

As discussed herein, the model training module 512 may generate any number of failure prediction models using the historical sensor data, the patterns, and different configurations for lead and observation time windows. For example, the model training module 512 may generate different failure prediction models for a component or set of components using different amounts of historical sensor data (e.g., historical sensor data generated over different time periods), using different patterns (based on event and alarm logs and/or metadata generated during different time periods), and with different lead lookahead times.

The model evaluation module 514 may evaluate any or all of the failure prediction models of a set generated by the model training module 512 to identify a preferred failure prediction model in comparison to the other preferred failure prediction models of the set and preferred criteria (e.g., longer lead times are preferred). The model evaluation module 514 may retrospectively evaluate failure prediction models on training, validation (including cross-validation) and testing data sets, and provide performance measure and confidence reports, including but not limited to AUC, accuracy, sensitivity, specificity and precision, and/or the like.

In various embodiments, the model evaluation module 514 may evaluate each failure prediction model of a set of failure prediction models for each component, component type, part, group of components, assets, and/or the like as discussed herein.

In various embodiments, model evaluation module 514 may assess a performance curvature to assist in selection of a preferred failure prediction model of a set. The performance look-up gives an expected forecasting outcome for a given lookback and lead time requirement. The performance look-up gives a reasonable lookback and lead time that an operator can expect.

In various embodiments, the component failure prediction system 104 may generate the performance curvature, including the lookback and lead times to enable a user or authorized device to select a point along the performance curvature to identify ad select a model with an expected forecasting outcome.

The model application module 516 may be configured to apply a preferred or selected failure prediction model (in comparison with other failure prediction models and selected by the model evaluation module 514 and/or an entity authorized to make the selection based on comparison of evaluation with any number of other generated models) to current (e.g., new) sensor data received from the same wind turbine or renewable asset equipment that was used to produce the sensor data of the previous received historical data.

There may be any number of selected failure prediction models, each of the selected failure prediction models being for a different component, component type, groups of components, groups of component type, asset, and/or asset type.

In various embodiments, the model application module 516 may compare new sensor data to classified and/or categorized states identified by the selected failure prediction model to identify when sensor data indicates a failure state or a state associated with potential failure is reached. In some embodiments, the model application module 516 may score the likelihood or confidence of such estate being reached. The model application module 516 may compare the confidence or score against a threshold in order to trigger an alert or report. In another example, the model application module 516 may compare the fit of sensor data to a failure state or state associate with potential failure that has been identified by the model of the model application module 516 in order to trigger or not trigger an alert or report.

The trigger module 518 may establish thresholds for different components, component types, groups of components, groups of component types, assets, and/or asset types. Each threshold may be compared to an output of one or more selected failure prediction models. Thresholds may be established based on the performance of the selected model in order to provide an alarm based on likelihood (e.g., confidence) of prediction, seriousness of fault, seriousness of potential effect of the fault (e.g., infrastructure or life threatened), lead time of fault, and/or the like.

It will be appreciated that there may be different categorized states identified during model training. Each categorized state may be associated with a different type of failure including mode of failure, component of failure, and/or the like.

The report and alert generation module 520 may generate an alert based on the evaluation of the model evaluation module 514. An alert may be a message indicating a failure or type of failure as well as the specific renewable energy asset (e.g., wind turbine or solar panel) that may be at risk of failure. Since the state identified by the failure prediction model is a state that is in advance of a potential failure, the alert should be triggered in advance of the potential failure such that corrective action may take place. In some embodiments, different alerts may be generated based on different possible failure and or different failure states. For example, some failure states may be more serious than others, as such more alerts and/or additional detailed alerts may be provided to a larger number of digital devices (e.g., cell phones, operators, utility companies, service computers, or the like) depending on the seriousness, significance, and/or imminence of failure.

In some embodiments, the report and alert generation module 520 may generate a report indicating any number of potential failures, the probability of such failure, and the justification or reasoning based on the model and the fit of previously identified states associated with future failure of components. The report may be a maintenance plan or schedule to correct the predicted fault (e.g., preferably before failure and a minimum of power disruption).

The data storage 522 may be any type of data storage including tables databases or the like. The data storage 522 may store models, historical data, current sensor data, states indicating possible future failure, alerts, reports, and/or the like.

The report and alert generation module 520 may be modified to provide actional insights within a report or alert.

Figure 25:
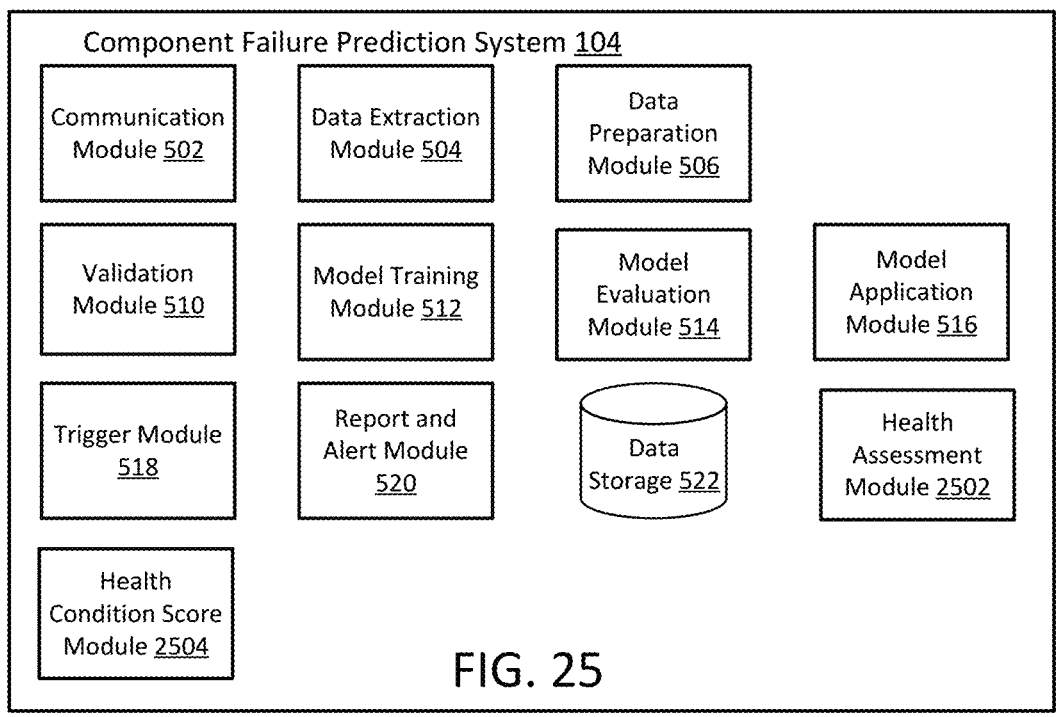
FIG. 25 is a block diagram of another example component failure prediction system in some embodiments.

FIG. 25 is a block diagram of another example component failure prediction system 104 in some embodiments. The component failure prediction system 104 may predict a component failure ahead of the actual failure. The component failure prediction system 104 may train and evaluate any number of models that predict component failure as well as assess asset and/or component health. It may be appreciated that the component failure prediction system 104 may be utilized to assess asset and/or component health without determining a failure risk score. In some embodiments, however, the component failure prediction system 104 may determine a maintenance priority score based on a combination of failure risk and healthy conditions scores.

As similarly discussed with regard to FIG. 5, the component failure prediction system 104 may train a set of component failure prediction models for any number of components or set of components using historical sensor data received from sensors of any number of electrical assets (e.g., including renewable energy electrical assets such as wind turbines) on SCADA information (further discussed herein). In some embodiments, each set of models predicts failure of a set of components of the same or different electrical assets.

The component failure prediction system 104 may train different failure prediction models of a set using the same metrics from historical sensor data but with different lead times and with different amounts of historical sensor data (e.g., different amounts of lookback times). The component failure prediction system 104 may evaluate the failure prediction models of the set based on sensitivity, precision, and/or specificity for the different lookback and lead times. As a result, the component failure prediction system 104 may select a failure prediction model of a set of failure prediction models for each component type (e.g., bearing), component (e.g., specific bearing(s) in one or more assets), component group type (e.g., generator including two or more components), component group (e.g., specific generator(s) including two or more components in one or more assets), asset type (e.g., wind turbines), or group of assets (e.g., specific set of wind turbines).

Metrics used to evaluate performance (e.g., based on values from sensor readings and/or from the sensors themselves) may be the same for different components even if the sensor data from sensors of the different components is different. By standardizing metrics for evaluation, the component failure prediction system 104 may "tune" or change aspects of the failure prediction model and model training to accomplish the goals of acceptable accuracy with acceptable lead time before the predicted failure. This enables improved accuracy for different components of electrical assets with improved time of prediction (e.g., longer prediction times is preferable).

In some embodiments, the component failure prediction system 104 may apply a multi-variate anomaly detection algorithm to sensors that are monitoring operating conditions of any number of renewable assets (e.g., wind turbines and or solar generators). The component failure prediction system 104 may remove data associated with a past, actual failure of the system (e.g., of any number of components and or devices), therefore highlighting subtle anomalies from normal operational conditions that lead to actual failures.

The component failure prediction system 104 may fine-tune failure prediction models by applying dimensionality reduction techniques to remove noise from irrelevant sensor data (e.g., apply principal component analysis to generate a failure prediction model using linearly uncorrelated data and/or features from the data). For example, the component failure prediction system 104 may utilize factor analysis to identify the importance of features within sensor data. The component failure prediction system 104 may also utilize one or more weighting vectors to highlight a portion or subset of sensor data that has a significant impact on the failure.

In some embodiments, the component failure prediction system 104 may further scope time series data of the sensor data by removing some sensor data from the actual failure time period. In various embodiments, the component failure prediction system 104 may optionally utilize curated data features to improve the accuracy of detection. Gearbox failure detection, for example, may utilize temperature rise in the gearbox with regards to power generation, reactive power, and ambient temperature.

In some embodiments, the component failure prediction system 104 may receive historical sensor data regarding renewable energy sources (e.g., wind turbines, solar panels, wind farms, solar farms, electrical grants, and/or the like). The component failure prediction system 104 may break down the data in order to identify important features and remove noise of past failures that may impact model building. The historical data may be curated to further identify important features and remove noise. The component failure prediction system 104 may further identify labels or categories for machine learning. It will be appreciated that component failure prediction system 104 may, in some embodiments, identify labels.

The component failure prediction system 104 may receive sensor data regarding any number of components from any number of devices, such as wind turbines from a wind farm. The sensor data may include multivariate timeseries data which, when in combination with the labels or categories for machine learning, may assist for deep learning, latent variable mining, may provide insights for component failure indication. These insights, which may predict upcoming failures, may effectively enable responses to upcoming failures with sufficient lead time before failure impacts other components of energy generation.

It will be appreciated that identifying upcoming failures for any number of components and renewable energy generation may become increasingly important as sources of energy migrate to renewable energy. Failure of one or more components may impact the grid significantly, and as a result may put the electrical grid, or the legacy components of the electrical grid, either under burden or cause them to fail completely. Further, failures of the electrical grid and/or failures of renewable energy sources may threaten loss of property, business, or life, particularly at times where energy is critical (e.g., hospital systems, severe weather conditions such as heat waves, blizzards, or hurricanes, care for the sick, care for the elderly, and/or care of the young).

The component failure prediction system 104 may comprise a communication module 502, a data extraction module 504, a data preparation module 506, a data extraction module 504, a validation module 510, a model training module 512, a model evaluation module 514, a model application module 516, a trigger module 518, a report and alert module 520, and a data storage 522. Examples discussed herein are with regard to wind turbines but it will be appreciated that various systems and methods described herein may apply to any renewable energy asset (e.g., photovoltaic panels) or legacy electrical equipment.

The communication module 502 may be configured to transmit and receive data between two or more modules in the component failure prediction system 104. In some embodiments, the communication module 502 is configured to receive information regarding assets of the electrical network 102 (e.g., from the power system 106, sensors within components of the electrical network 102 such as the renewable energy sources 112, third-party systems such as government entities, other utilities, and/or the like).

The communication module 502 may be configured to receive failure data, health data, asset data (e.g., WT failure data & asset data), sensor data, and SCADA information (See phase 1 of FIG. 6). Failure data may indicate failure of a component or combination of components.

Health data may indicate healthy operation of a component or combination of components. As discussed herein, if SCADA data indicates that an asset is sufficiently healthy (e.g., not likely to fail or if the SCADA data is within expected parameters), then that particular asset may be removed from a maintenance schedule and/or removed from a list of assets that may require supervision or surveillance (or, alternately, the priority for surveillance may be reduced relative to other assets).

In some embodiments, health data may include data that indicates that a component or combination of components is operating as expected or is operating as expected for a "healthy asset or component(s)). In various embodiments, health data may include data that indicates that a component or combination of components is operating within a range of expected parameters (e.g., range of parameters that is considered to be healthy). Health data may include data performance data (e.g., sensor data indicating performance). In this example, health data itself may not, by itself, indicate if the asset or component(s) are healthy without comparing the health data to an expected threshold. In some embodiments, the health data includes an asset identifier (e.g., turbine identifier), and sensor data of components or a group of components of the asset identified by the asset identifier.

In one example, health data may be received from wind turbines. For example, health data may include but is not be limited to a turbine identifier (e.g., TurbineId) that identifies a wind turbine or group of wind turbines, wind turbine asset data, and sensor data. The wind turbine asset data may include, but is not limited to, wind turbine generation, mark version, geolocation, and/or the like. Wind turbine generation may indicate an amount of power being generated. A mark version may be a version of a component, subcomponent, part, or wind turbine. The geolocation may indicate the geographic location of a wind turbine or group of wind turbines. Sensor data may be from sensors of electrical assets either individually or in combination (e.g., wind turbines, solar panels, wind farms, solar farms, components of devices, components of wind turbines, components of solar panels, substations 114, transformers 116, and/or transmission lines 110). The communication module 502 may further receive sensor data from one or more sensors of any number of electrical assets such as those described above. The sensor data may, in some embodiments, be received by a SCADA system and provided by a SCADA system.

As discussed herein, Supervisory Control and Data Acquisition (SCADA) is a control system architecture often used to monitor and control aspects of hardware and software systems and networks. SCADA systems may be utilized for remote supervision and control of wind turbines and wind farms. For example, the SCADA system may enable control of any number of wind turbines in the wind farm (e.g., clusters of wind turbines, all wind turbines, or one wind turbine). The SCADA system may provide an overview of relevant parameters of each wind turbine including, for example, temperature, pitch angle, electrical parameters, rotor speed, yaw system, rotor velocity, azimuth angle, nacelle angle, and the like. The SCADA system may also allow remote access to the SCADA system to supervise and monitor any number of wind turbines of any number of wind farms. SCADA system provide important signals for historical and present status of any number of wind turbines (WTs).

The SCADA system may further log data regarding any number of the wind turbine such as failures, health information, performance, and the like. The SCADA system may allow access to the log data to one or more digital devices.

While examples of wind farms and wind turbines are discussed herein, it will be appreciated that SCADA systems may be utilized on any type of electrical asset or combination of different types of electrical assets including, for example, solar power generators, legacy electrical equipment, and the like.

Health data may include, for example, SCADA system data that include indications of health or data that is without an indication of failure or warning. SCADA sensors continuously monitor important variables of the wind turbine, environment, and the grid (e.g., temperature of various parts, active/reactive power generation, wind speed, rotation speed, grid frequency, voltage, current, and the like. The sensor data may be a multi-variant time series.

Some embodiments of systems and methods discussed herein leverage machine learning method(s) to extract a number of actionable insights from this valuable information.

The SCADA system may generate or transmit data that includes event codes or logs indicative of health (e.g., not only failure). The event and alarm logs may include, but are not limited to, a turbine identifier (e.g., turbineID), event code (e.g., EventCode), event type (e.g., EventType), event start time (e.g., EventStartTime), event end time (e.g., EventEndTime), component, subcomponent, and/or the like. The turbine identifier may be an identifier that identifies a particular wind turbine or group of turbines. An event code may be a code that indicates an event associated with performance or health of the particular wind turbine or group of turbines. The event type may be a classification of performance or health. An event start time may be a particular time that an event (e.g., an occurrence that affects performance or health) began and an event end time may be a particular time that the event ended. Components and subcomponents may include identifiers that identify one or more components or subcomponents that may be affected by the event.

Figure 26:
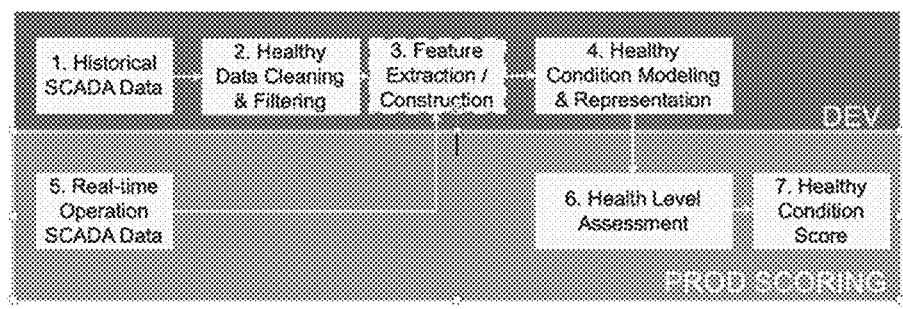
FIG. 26 depicts a block diagram indicting a flow of a hybrid process for predicting failures, coordinating maintenance, and assessing priority of surveillance of assets in some embodiments.

FIG. 26 depicts a block diagram indicting a flow of a hybrid process for predicting failures, coordinating maintenance, and assessing priority of surveillance of assets in some embodiments. In phase 1, as indicated in FIG. 26, the communication module 502 may receive SCADA data from one or more SCADA systems. The SCADA data may be received in real-time (e.g., when or near when generated) or may be received after a period of time where the data was previously stored.

As used herein, a model training period may include a time period used to select training instances. An instance is a set of time series/event features along with the performance of a particular component in a renewable energy asset (e.g., a wind turbine) in a specified time period. A model testing period is a time period used to select testing instances. In one example, health data may include performance data of an asset, component, or group of components wherein the performance data is not associated with a particular, identified failure (e.g., the performance data was not generated during a failure and/or during a time where there is an indication of failure of the asset, component, or group of components).

In phase 2, as depicted in FIG. 26, the data preparation module 506 may clean any amount of the SCADA data to attain a health condition representation. For example, the data preparation module 506 may perform power curve-based filtering and/or event log-based filtering. The data preparation module 506 may filter power curve data to identify power curves that align with power generation expectation to represent normal and/or health conditions.

For example, the data preparation module 506 may identify SCADA data indicating or being associated with a power curve of an asset or component(s). In some embodiments, the data preparation module 506 may identify an asset or component(s) from the SCADA data. The data preparation module 506 may retrieve a power curve example and other signal examples that indicate health. The data preparation module 506 may retrieve the power curve example and/or other signal examples based on asset(s) and/or component(s) identified in the SCADA data.

In some embodiments, the data preparation module 506 may compare power curve data from the SCADA data to an expected power curve (e.g., the power curve example) for that particular asset and/or component(s) to identify a power curve in the SCADA data that may be healthy. If the power curve data from the SCADA data does not fit the expected power curve within a power curve threshold, the data preparation module 506 may not identify the power curve data from the SCADA data as healthy. If the power curve data from the SCADA data fits the expected power curve within a power curve threshold, the data preparation module 506 may identify the power curve data from the SCADA data as healthy.

If the power curve data from the SCADA data is identified as healthy, the data preparation module 506 may identify sensor data of the same asset or component(s) that was generated at or near the time (e.g., within a particular predetermined period of time) that the power curve data was generated, and then include that SCADA data for modeling (e.g., only using SCADA data associated with an indication of health to train a model). If the power curve data from the SCADA data is identified as unhealthy or simply not healthy, the data preparation module 506 may identify sensor data of the same asset or component(s) that was generated at or near the time (e.g., within a particular predetermined period of time) that the power curve data was generated, and then filter that data out from the SCADA data (e.g., removing potentially unhealthy SCADA data).

Although the example above refers to power curve data, the data preparation module 506 may also retrieve any signal examples based on an asset or component(s) identifiers in the SCADA data and compare one or more particular signals from the SCADA data to the signal example to determine if the signal is associated with a healthy condition (e.g., in comparison to the signal example, the signal data from the SCADA data is similar to the signal example within a signal threshold).

If the signal data (e.g., any signal in the SCADA data) from the SCADA data is identified as healthy, the data preparation module 506 may identify sensor data of the same asset or component(s) that was generated at or near the time (e.g., within a particular predetermined period of time) that the signal data was generated, and then include that SCADA data for modeling (e.g., only using SCADA data associated with an indication of health to train a model). If the signal data from the SCADA data is identified as unhealthy or simply not healthy, the data preparation module 506 may identify sensor data of the same asset or component(s) that was generated at or near the time (e.g., within a particular predetermined period of time) that the signal data was generated, and then filter that data out from the SCADA data (e.g., removing potentially unhealthy SCADA data).

The data preparation module 506 may perform event log-based filtering to discard undesirable SCADA data that was generated during or immediately before maintenance of the asset and/or components, shut down of the asset and/or components, restarting of the asset and/or components, and/or an indication of failure of the asset and/or components. For example, the data preparation module 506 may receive any number of logs from any number of assets and/or components. The data preparation module 506 may scan and identify data from the logs indicating maintenance, restarts, failures, and the like. The data preparation module 506 may then identify sensor data generated by the same asset and/or component(s) that generated the log data indicating maintenance, restarts, failures, and the like and subsequently remove sensor data generated at or during a predetermined period of time (e.g., a time threshold of minutes, hours, or days). The predetermined period of time may begin at the time of the first indication from the log data of maintenance, restarts, failures, and the like. In some embodiments, the predetermined period of time may begin at a period of time (e.g., seconds, minutes, hours, or the like) before the first indication in the log data of maintenance, restarts, failures, and the like. In some embodiments, the data preparation module 506 may utilize different predetermined periods of time to remove sensor data from the SCADA data depending on the type of log indication (e.g., a first predetermined period of time for maintenance, a second predetermined period of time for a restart, and different predetermined periods of time depending on the type of failure).

The data extraction module 504 may de-noise features and patterns of the data may be extracted. In some embodiments, the data extraction module 540 may identify principal components using principal component analysis on the SCADA data to explain the largest variation of multi-dimensional input space.

In various embodiments, the data extraction module 504 may extract data sequences from received data by means of a rolling observation window (e.g., rolling observation time window). Data instance contains sensor signals from an observation window. New data samples are generated by moving the observation window with a fixed stride value.

After extracting the data samples, the data preparation module 506 may clean the data to make it ready for feeding to a machine training model (e.g., one or more neural networks). There may be two types of missing values in SCADA sensor signals. The first type of missing values in SCADA sensor signals is when one sensor has missing values for the whole observation window or a portion within the observation window. In this case, the data preparation module 506 may impute the missing value by replacing that with the most similar available signal. For example, if the missing value is one of the voltage sensors, the data preparation module 506 replaces that with the voltage of other phases, or if the missing value is the temperature of a subcomponent, the data preparation module 506 replaces that with a temperature of a neighboring component.

The data preparation module 506 may also, in some embodiments, perform a data quality check. For example, the data preparation module 506 may apply an 80% availability filter to sensor data for sufficient data. FIG. 11 is an example of a dataset when an 80% availability filter is applied over three years (2014 to 2017). In FIG. 11, eighty-one sensors are reduced to thirty-five.

In phase 3, as depicted in FIG. 26, the data extraction module 504 may optionally extract features (e.g., dimensions and/or variables) from the received historical sensor data. The multivariate sensor data may, as discussed herein, be time-series data. For example, the data extraction module 504 may extract features from the time series data. The data extraction module 504 may provide the extracted features to the validation module 510 and/or the model training module 512 for training and/or validating one or more failure prediction models.

In various embodiments, feature extraction may also refer to the process of creating new features from an initial set of data. These features may encapsulate central properties of a data set and represent the data set and a low dimensional space that facilitates learning. As can be appreciated, the initial multivariate sensor data may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data.

It will be appreciated that, in some embodiments, dimensions may refer to columns (e.g., features or variables) of the received historical sensor data.

In phase 4, as depicted in FIG. 26, the model training module 512 may develop a model to present a normal/desired behavior or renewable assets. In one example, the model training module 512 may generate a simple one-dimension regression representation of a target signal using other relevant signals or a multi-dimension regression representation of a set of signals using deep learning encoding technique (as discussed herein).

In some embodiments, the model training module 512 may utilize varying lead time windows and provide for robust analysis. The model training module 512 may utilize a deep neural network that has convolutional layers, recurrent layers, and feed-forward layers.

The model training module 512 may utilize a neural network to generate models based on the health data (e.g., features of the SCADA data associated with acceptable performance that had been cleaned, optionally filtered, and optionally constructed).

As discussed regarding FIG. 15, this figure depicts divisions of the data into three exclusive sets for training, validation, and testing in some embodiments. FIG. 15 also includes the three classes discussed above. In various embodiments, for training, sets have a balanced number of samples from each class. The test set preferably mimics the real world and training is inclusive. Unlike partitioning based on failure, partitioning may be performed based on performance, time, health, and/or the like.

The model training module 512 may utilize classification algorithms for model training. The classifications may include for example, SVM, DeepLearning (such as CNN or CHAID). The training model input may include balanced input such as, for example, historical sensor data, extracted features from the historical sensor data, scoped anomaly time series from the historical sensor data and event data, scoped weighted sensor time series from the historical sensor data, and/or failure indications. In some embodiments, the time-series data is a matrix where the start time the end time of the time-series include maximum lead time, minimum lead time, and per desired time horizon (e.g., 45 days to 10 days before an event).

In various embodiments, the model training module 512 may utilize a deep neural network including three layers. For example, a forecasting method and system is discussed herein may leverage a combination of advantages of various deep learning methods (e.g., CNN, RNN) to improve forecasting performance. This methodology may also address flexible and multiple-lead time windows in one developed model, which reflects more realistic component degradation process and provides more practical usage.

The three layers may include a fully connected neural network (FC), a convolutional neural network (CNN), and a recurrent neural network (RNN). The model training module 512 may also apply dropout techniques, gradient clipping, and batch normalization.

Phase 4 may generate health models in a manner that is similar to that of generating models for failure. FIG. 16 is a flowchart using different layers of a fully connected neural network (FC), a convolutional neural network (CNN), and a recurrent neural network (RNN) in some embodiments. In step 1602, the communication module 502 receives channels of data. For example, the communication module 502 may receive 35 channels of sensor data (e.g., the thirty-five sensors may be the thirty-five sensors identified in FIG. 11).

In step 1604, the model training module 512 may utilize the convolutional neural network (CNN) layer configured (in this example) with a kernel size of five, a stride of 1, number of filters 45 and rectified linear unit (ReLU) activation function. The ReLU may accelerate convergence of stochastic gradient descent. The output size in this example is batch*45*T (where T may be time).

In step 1606, the model training module 512 may utilize max-pooling configured (in this example) of a pool size of four and a stride of four. Max pooling is a sample-based discretization process with the objective of down-sampling an input representation thereby allowing for dimensionality reduction. The output of max-pooling in this example is batch*45*T/4.

In step 1608, the model training module 512 may perform dropout techniques on the data received from max pooling. Dropout is a regularization technique for reducing overfitting in neural networks. The model training module 512 may drop out units (both hidden and visible).

In step 1610, the model training module 512 may utilize a long short-term memory (LSTM) network (e.g., as a recurrent network). LSTM networks are well-suited to classifying, processing, and making predictions based on time series data, since there can be lags of unknown duration between important events in a time series. The output size of the LSTM network in this example is batch*45.

In step 1612, the model training module 512 may again perform dropout techniques on the data received from max pooling.

In step 1614, the model training module 512 may utilize the fully connected neural network (FC) layer configured (in this example) with three hidden units. The output size of the FC in this example is batch*3.

In step 1616, the model training module 512 utilizes a softmax function to receive the output from the FC. The softmax function takes an un-normalized vector, and normalizes it into a probability distribution.

The model training module 512 may generate any number of health models using the historical sensor data and different configurations for lead time. For example, the model training module 512 may generate different health models using different amounts of historical sensor data (e.g., historical sensor data generated over different time periods) and with different lead lookahead times.

The model evaluation module 514 may evaluate the different health modules generated by the model training module 512. In various embodiments, the model evaluation module 514 applies macro-averaging of performance measures (e.g., accuracy, error rate, precision, recall, and the like).

In various embodiments, the model evaluation module 514 compares the predictions of each health model of a set of health models using historical sensor data to compare the results against ground truth (e.g., known failures and known periods of time that the component did not fail). The model evaluation module 514 may separate the outcomes into qualitative categories including true positives (TP), false positives (FP), true negatives (TN), false negatives (FN), positives (TP+FN), and negatives (TN+FP).

The model evaluation module 514 may utilize a health forecasting performance measures (e.g., standard metrics in any detection/classification model) to generate a confusion matrix. The metrics may include any or all of the following:
Confusion Matrix (FP,FN,TP,TN)
Receiver Operating Characteristics
Area Under the Curve
Predicted Health->Not Failed: True Positive
Predicted Health->Failed: False Positive
Predicted Not Healthy->Failed: True Negative
Predicted Not Healthy->Not Failed: False negative
Examples of the metrics may include the following:
Sensitivity, Recall, Hit Rate, or True Positive Rate (TPR):

TPR=TP/$P$=TP/(TP+FN)

Specificity or True Negative Rate (TNR)

TNR=TN/$N$=TN/(TN+FP)

Precision or Positive Predictive Value (PPV)

PPV=TP/(TP+FP)

Negative Predictive Value (NPV)

NPV=TN/(TN+FN)

Miss Rate or False Negative Rate (FNR)

FNR=FN/$P$=FN/(FN+TP)=1−TPR

Fall-out or False Negative Rate (FNR)

FPR=FP/$N$=FP/(FP+TN)=1−TNR

False Discovery Rate (FDR)

FDR=FP/(FP+TP)=1−PPV

False Omission Rate (FOR)

FOR=FN/(FN+TN)=1−NPV

Accuracy (ACC)

ACC=(TP+TN)/($P$+$N$)=(TP+TN)/(TP+TN+FP+FN)

The F1 score is the harmonic mean of precision and sensitivity:

$$F_1 = 2 \cdot \frac{PPV \cdot TPR}{PPV + TPR} = \frac{2TP}{2TP + FP + FN}$$

The Matthews correlation coefficient (MCC) is:

$$MCC = \frac{TP \times TN - FP \times FN}{\sqrt{(TP+FP)(TP+FN)(TN+FP)(TN+FN)}}$$

The informedness or Bookmaker Informedness (BM) is:

BM=TPR+TNR−1

MK=PPV+NPV−1 The Markedness (MK) is

MK=PPV+NPV−1

In various embodiments, the model evaluation module 514 determines a receiver operator characteristic area under the curve (ROC AUC) to assist in model performance evaluation. The Operating Characteristic Area Under the Curve is a measure of classifier performance in machine learning. When using normalized units, the area under the curve is equal to the probability that a classifier will rank a randomly chosen positive instance higher than a randomly chosen negative one (assuming 'positive' ranks higher than 'negative').

In various embodiments, the methodology may be extended to a multi-component forecasting method. The methodology may forecast multiple components of wind turbine simultaneously using one model, which is a more scalable way for model development and addresses the scenarios of multiple component degradation simultaneously in wind turbine life cycle.

In one example, input may be received, data extracted, cleaned, processed, and trained with the deep neural network (CNN, RC, and FC). The three zscores for the different generations are passed through the softmax function and then through a cross entropy function.

In another example, input may be received, data extracted, cleaned, processed, and trained with the deep neural network (CNN, RC, and FC). The six zscores for the different generations are passed through the softmax function(s) and then through the cross entropy function(s). A total cost may be generated.

The validation module 510 may be configured to evaluate performance of the health models generated by the validation module 510. In some embodiments, the validation module 510 may perform x fold cross validation (CV) on training data sets to establish CV performance, including uncertainty of prediction. The validation module 510 may test the developed model on balanced testing data sets (e.g., about 50:50 (failed and non-failed systems) or to be tuned for the desired business outcome).

In phase 5 of FIG. 26, new real-time operation SCADA data may be received by the communication module 502. The SCADA data may be any real-time data from any number of assets, components, or groups of components. The communication module 502 may, in some embodiments, receive real-time operation SCADA data from the same assets (or different assets) that provided the historical SCADA data in phase 1. In one example, the communication module 502 receives time series data (e.g., 10 Minute sampled time series data from the real-time operation SCADA data (e.g., from sensors of assets and/or component(s)). The real-time operation SCADA data may be from, for example, hundreds of different environmental, electrical and mechanical sensors to monitor the turbine status and function, including but not limit to ambient temperature, wind speed, generator slipring temperature, etc.

Features may optionally be extracted and/or constructed from the real-time operation SCADA data. In various embodiments, if one or more models are created using features that were extracted and/or constructed from historical SCADA data (e.g., from phase 1), then the same features may be extracted and/or constructed from the real-time operation SCADA data (received in phase 5). The received real-time operation SCADA data may optionally be denoised and/or patterns identified through features extracted/constructed.

The model application module 516 may compare new sensor data to classified and/or categorized states identified by the health model(s) to identify when sensor data indicates a health state or performance state. In some embodiments, the model application module 516 may score the likelihood or confidence of such a state being reached. The model application module 516 may compare the confidence or score against a threshold in order to trigger an alert or report. In another example, the model application module 516 may compare the fit of sensor data to a health state or state associate with potential failure that has been identified by the model of the model application module 516 in order to trigger or not trigger an alert or report.

In phase 4 of FIG. 26, a trained, healthy condition model/representation may be retrieved. In various embodiments, a trained, healthy condition model/representation may be retrieved based on an asset identifier, a category of assets identified, component identifier, or the like associated with the SCADA data (or any other data or metadata associated with the SCADA data). In some embodiments, there may be a single health condition model/representation or a small set of models/representations that may be utilized in conjunction with SCADA data from a variety of assets and/or component(s).

In various embodiments, a general health condition model/representation may be utilized. The general health condition model/representation may be utilized for SCADA data received by any number of assets and components (e.g., the model/representation itself may have been trained using SCADA data received by any number of assets and components).

The real-time operation SCADA data and/or extracted features from the real-time operation SCADA data may be applied to the trained healthy condition model/representation.

In phase 6 of FIG. 26, the health assessment module 2502 may determine a health assessment based on the results from the application of the real-time operation SCADA data to the trained, healthy condition model/representation. The health assessment module 2502 may determine a severity of deviation from desired operation behaviors based on an assessment of the results from the application of real-time SCADA data to the model/representation.

In phase 7 of FIG. 26, the health condition score module 2504 may generate a health condition score by converting the health assessment into a monotonic health condition score.

If the health condition score is above a health condition threshold, the asset or components may be removed from a schedule of routine maintenance. In some embodiments, if the health condition score is above a health condition threshold, the asset or components may be removed from a schedule for surveillance or reduced in priority relative to other assets and/or components that are not determined to be in a health condition.

Figure 27:
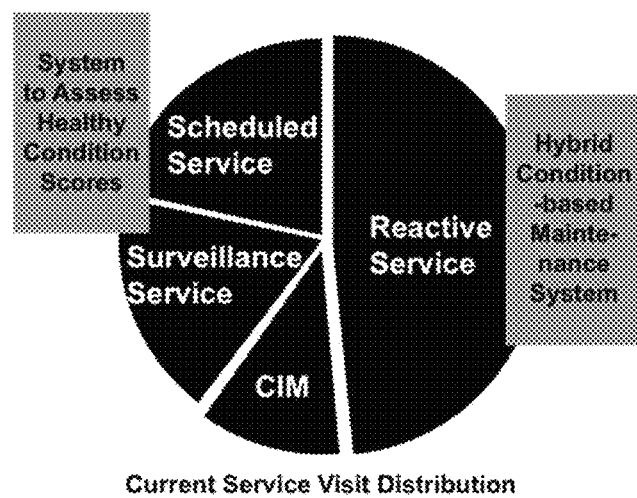
FIG. 27 depicts a pie graph of a cost reduction strategy in some embodiments.

FIG. 27 depicts a pie graph of a cost reduction strategy in some embodiments. Health condition scores of assets and/or components may be utilized to reduce or eliminate scheduled service, surveillance service, and/or monitoring. Further, a health condition score may reduce or eliminate assets or component(s) from consideration for reactive services.

It will be appreciated that the health condition scoring process (e.g., as depicted in FIG. 27) may be utilized in conjunction with the failure prediction process discussed herein to create a hybrid process to reduce cost related to scheduled service, surveillance service, CIM, and reactive service.

Figure 28:
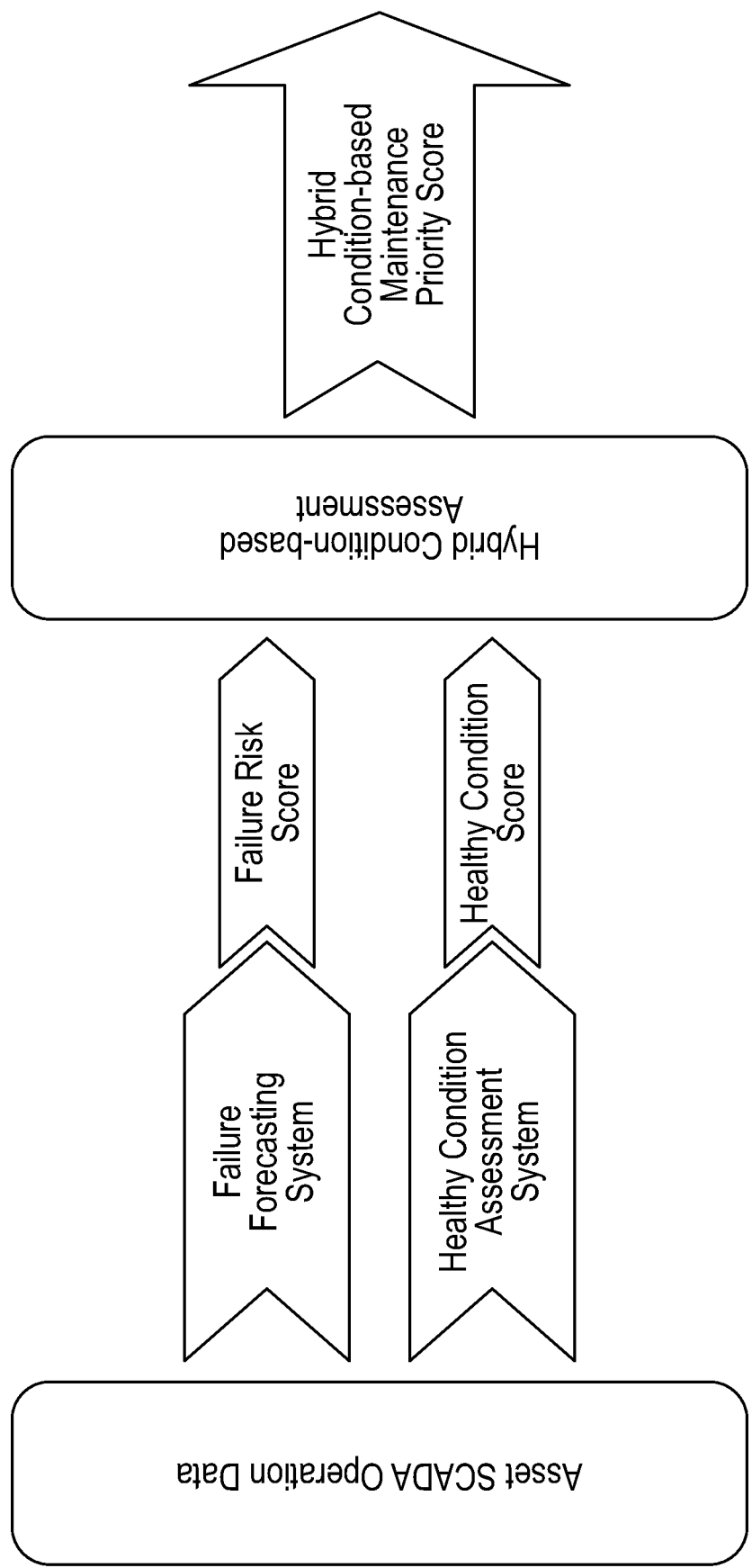
FIG. 28 depicts a graph of a hybrid condition-based maintenance priority score system for assessment for maintenance, reactive service, surveillance, and/or monitoring in some embodiments.

FIG. 28 depicts a graph of a hybrid condition-based maintenance priority score system for assessment for maintenance, reactive service, surveillance, and/or monitoring in some embodiments. The failure forecasting system as disclosed regarding FIGS. 6-20 may be utilized in the hybrid process depicted in FIG. 28. The health assessment and scoring system as disclosed regarding FIGS. 25-27 may also be utilized in the hybrid process depicted in FIG. 28. Both processes may utilize the same SCADA real-time data.

For example, real-time SCADA data may be received. A copy of the real-time SCADA data may be cleaned, normalized and features extracted for the failure prediction process before the processed real-time SCADA data is applied to one or more failure models for failure prediction. Similarly, the real-time SCADA data (or a copy thereof), may be cleaned, normalized and features extracted for the health condition assessment and scoring process before the processed real-time SCADA data is applied to one or more health condition models.

In various embodiments, during the hybrid condition-based assessment, healthy assets and/or components (e.g., those with health scores above or at a particular health threshold) may be removed from consideration or filtered to assist in assessing those assets and/or components that require reactive services to prevent potential failure.

It may be appreciated that the hybrid condition-based maintenance process may include several stages. A first stage may be to determine maintenance and reactive services. In this stage, healthy assets and/or components may be removed from consideration in or order to eliminate false positives and false negatives from the assessment of potential failing equipment (e.g., by identifying assets and components as healthy even if they received an indication of potential failure or identifying assets and components as potentially not healthy even if they received an indication of not being potentially failing). This may assist in removing assets and components from consideration for maintenance and service.

A second stage may be to determine surveillance of assets or components. In this example, potentially failing assets and/or component(s) may be scheduled for surveillance (e.g., by physical inspection) and those assets that are potentially healthy may be reduced in priority or removed from being scheduled for surveillance.

A third stage may be to determine monitoring of assets or components. In this example, potentially failing assets and/or component(s) may be monitored more aggressively (e.g., watched and assessed more frequently or alert conditions may be triggered by a more stringent criteria) as compared to monitoring for those assets and/or component(s) that are potentially healthy may be reduced in priority or removed from being scheduled for surveillance.

Figure 29:
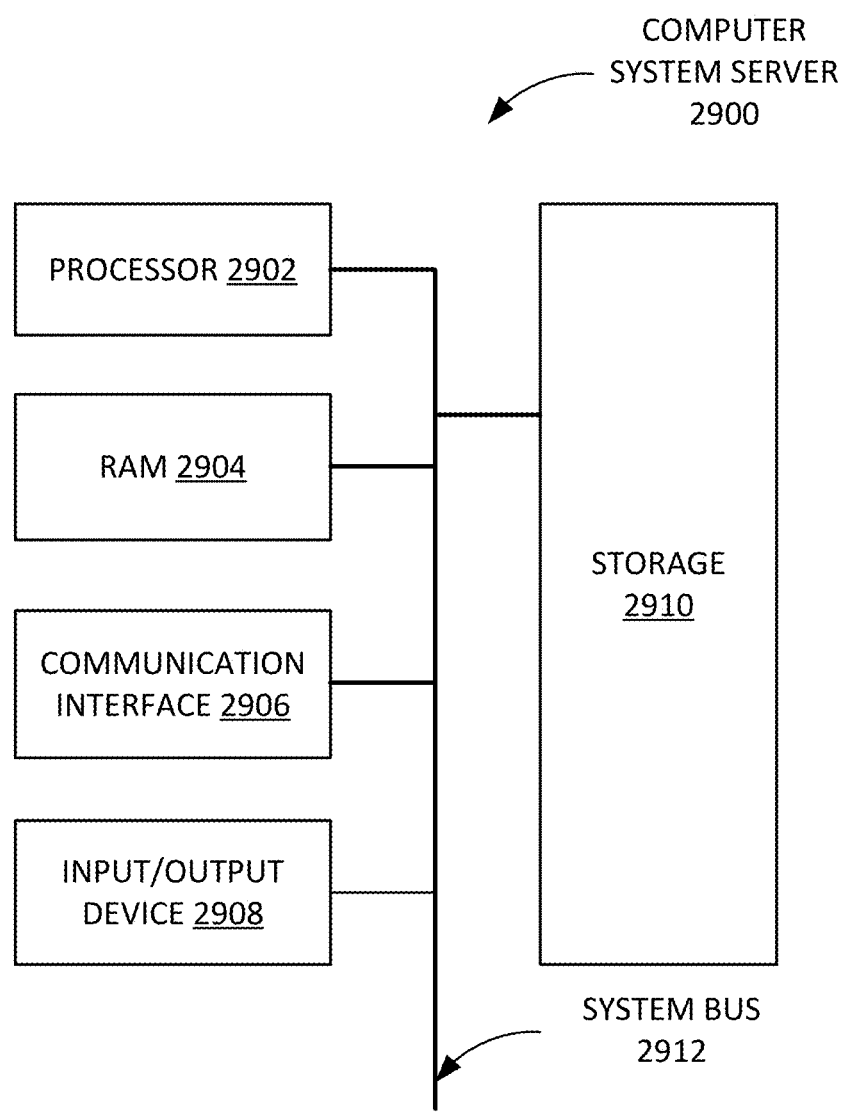
FIG. 29 depicts a block diagram of an example computer system server according to some embodiments.

FIG. 29 depicts a block diagram of an example computer system server 2900 according to some embodiments. Computer system server 2900 is shown in the form of a general-purpose computing device. Computer system server 2900 includes processor 2902, RAM 2904, communication interface 2906, input/output device 2908, storage 2910, and a system bus 2912 that couples various system components including storage 2910 to processor 2902.

System bus 2912 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 2900 typically includes a variety of computer system readable media. Such media may be any available media that is accessible by the component failure prediction system 104 and it includes both volatile and nonvolatile media, removable and non-removable media.

In some embodiments, processor 2902 is configured to execute executable instructions (e.g., programs). In some embodiments, the processor 2902 comprises circuitry or any processor capable of processing the executable instructions.

In some embodiments, RAM 2904 stores data. In various embodiments, working data is stored within RAM 2904. The data within RAM 2904 may be cleared or ultimately transferred to storage 2910.

In some embodiments, communication interface 2906 is coupled to a network via communication interface 2906. Such communication can occur via Input/Output (I/O) device 2908. Still yet, component failure prediction system 104 can communicate with one or more networks such as a local area network (LAN), a general wide area network (WAN), and/or a public network (e.g., the Internet).

In some embodiments, input/output device 2908 is any device that inputs data (e.g., mouse, keyboard, stylus) or outputs data (e.g., speaker, display, virtual reality headset).

In some embodiments, storage 2910 can include computer system readable media in the form of volatile memory, such as read only memory (ROM) and/or cache memory. Storage 2910 may further include other removable/non-removable, volatile/non-volatile computer system storage media. By way of example only, storage 2910 can be provided for reading from and writing to a non-removable, non-volatile magnetic media. The storage 2910 may include non-transitory media that stores programs or applications for performing functions such a those described regarding FIG. 5. Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 2912 by one or more data media interfaces. As will be further depicted and described below, storage 2910 may include at least one program product having a set (e.g., at least one) of program modules that are configured to carry out the functions of embodiments of the invention. In some embodiments, RAM 2904 is found within storage 2910.

Program/utility, having a set (at least one) of program modules, such as component failure prediction system 104, may be stored in storage 2910 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with component failure prediction system 104. Examples include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer readable medium comprising executable instructions, the executable instructions being executable by one or more processors to perform a method, the method comprising:
   receiving first current sensor data of a second time period, the first current sensor data including sensor data from one or more sensors of one or more components of any number of renewable energy assets;
   applying at least one previously trained machine learning model to the current sensor data to generate a first failure prediction of a failure of at least one component of the one or more components and to generate a list of renewable energy assets that are operating within a healthy threshold, the at least one previously trained machine learning models being trained to indicate a set of one or more number of renewable energy assets that are operating within a healthy threshold;
   comparing the first failure prediction to a trigger criteria;
   generating and transmitting a first alert if comparing the first failure prediction to the trigger criteria indicates a failure prediction, the first alert indicating the at least one component of the one or more components and information regarding the failure prediction; and updating a list of renewable energy assets to perform surveillance based on the list of renewable energy assets that are operating within a healthy threshold.

2. The non-transitory computer readable medium of claim 1, the method further comprises:

receiving historical sensor data, the historical sensor data including sensor data from one or more sensors of one or more components of any number of renewable energy assets, the historical sensor data indicating at least one first failure associated with the one or more components of the renewable energy asset during a first time period; and performing a quality check and applying an availability filter to the historical sensor data.

3. The non-transitory computer readable medium of claim 1, the method further comprises detecting missing sensor data and replacing the missing sensor data with a linear interpolation.

4. The non-transitory computer readable medium of claim 1, the method further comprises separating historical sensor data into training and validation based on failure events and test set is separated based on time.

5. The non-transitory computer readable medium of claim 1, the method further comprises:

determining healthy assets of the number of renewable energy assets, the determining includes comparing one or more signals from one or more systems to known healthy operating signals comprises performing power curve-based filtering and event log-based filtering.

6. The non-transitory computer readable medium of claim 1, wherein performing power curve-based filtering and event log-based filtering comprises comparing identifying an asset ID from wind turbine asset data, retrieving an expected power curve, and comparing the expected power curve to a generated power curve received from the wind turbine asset data.

7. The non-transitory computer readable medium of claim 1, wherein training the at least one machine learning model comprises training at least one failure prediction model to indicate the first set of the one or more number of renewable energy assets that may potentially fail and training a health prediction model to indicate the second set of the one or more number of renewable energy assets that are operating within a healthy threshold.

8. The non-transitory computer readable medium of claim 7, wherein current sensor data is applied to the health prediction model and if one or more renewable energy assets are operating within the health threshold, filtering the one or more renewable energy assets that are operating within the health threshold from current sensor data before applying remaining current sensor data to the failure prediction model.

9. The non-transitory computer readable medium of claim 1, wherein receiving the first current sensor data of the second time period comprises receiving the first current sensor data from current SCADA systems.

10. The non-transitory computer readable medium of claim 1, the method further comprises generating an event and alarm vendor agnostic representation of event and alarm data creating a feature matrix, wherein the feature matrix includes a unique feature identifier for each feature of the event and alarm data and one or more features from the event and alarm data, and extracting patterns of events based on the feature matrix, the training the first set of failure prediction models using a deep neural network being further is based on the patterns of events.

11. A component failure prediction system, comprising:
at least one processor; and
memory containing instructions, the instructions being executable by the at least one processor to:
receive first current sensor data of a second time period, the first current sensor data including sensor data from one or more sensors of one or more components of any number of renewable energy assets;
apply at least one previously trained machine learning model to the current sensor data to generate a first failure prediction of a failure of at least one component of the one or more components and to generate a list of renewable energy assets that are operating within a healthy threshold, the at least one previously trained machine learning models being trained to indicate a set of one or more number of renewable energy assets that are operating within a healthy threshold;
compare the first failure prediction to a trigger criteria;
generate and transmitting a first alert if comparing the first failure prediction to the trigger criteria indicates a failure prediction, the first alert indicating the at least one component of the one or more components and information regarding the failure prediction; and
update a list of renewable energy assets to perform surveillance based on the list of renewable energy assets that are operating within a healthy threshold.

12. The component failure prediction system of claim 11, the instructions being executable by the at least one processor to further:

receive historical sensor data, the historical sensor data including sensor data from one or more sensors of one or more components of any number of renewable energy assets, the historical sensor data indicating at least one first failure associated with the one or more components of the renewable energy asset during a first time period; and perform a quality check and applying an availability filter to the historical sensor data.

13. The component failure prediction system of claim 11, the instructions being executable by the at least one processor to further: detect missing sensor data and replacing the missing sensor data with a linear interpolation.

14. The component failure prediction system of claim 11, the instructions being executable by the at least one processor to further separate historical sensor data into training and validation based on failure events and a test set is separated based on time.

15. The component failure prediction system of claim 11, the instructions being executable by the at least one processor to further:

determine healthy assets of the number of renewable energy assets, the determining includes comparing one or more signals from one or more systems to known healthy operating signals comprises performing power curve-based filtering and event log-based filtering.

16. The component failure prediction system of claim 11, wherein performing power curve-based filtering and event log-based filtering comprises comparing identifying an asset ID from wind turbine asset data, retrieving an expected power curve, and comparing the expected power curve to a generated power curve received from the wind turbine asset data.

17. The component failure prediction system of claim 11, wherein training the at least one machine learning model comprises training at least one failure prediction model to indicate the first set of the one or more number of renewable energy assets that may potentially fail and training a health prediction model to indicate the second set of the one or more number of renewable energy assets that are operating within a healthy threshold.

18. The component failure prediction system of claim 17, wherein current sensor data is applied to the health prediction model and if one or more renewable energy assets are operating within the health threshold, filter the one or more renewable energy assets that are operating within the health threshold from current sensor data before applying remaining current sensor data to the failure prediction model.

19. The component failure prediction system of claim 11, wherein receiving the first current sensor data of the second time period comprises receiving the first current sensor data from current SCADA systems.

20. The component failure prediction system of claim 11, the instructions being executable by the at least one processor to further generate an event and alarm vendor agnostic representation of event and alarm data creating a feature matrix, wherein the feature matrix includes a unique feature identifier for each feature of the event and alarm data and one or more features from the event and alarm data, and extracting patterns of events based on the feature matrix, the training the first set of failure prediction models using a deep neural network being further is based on the patterns of events.

21. A method comprising:
receiving first current sensor data of a second time period, the first current sensor data including sensor data from one or more sensors of one or more components of any number of renewable energy assets;
applying at least one previously trained machine learning model to the current sensor data to generate a first failure prediction of a failure of at least one component of the one or more components and to generate a list of renewable energy assets that are operating within a healthy threshold, the at least one previously trained machine learning models being trained to indicate a set of one or more number of renewable energy assets that are operating within a healthy threshold;
comparing the first failure prediction to a trigger criteria;
generating and transmitting a first alert if comparing the first failure prediction to the trigger criteria indicates a failure prediction, the first alert indicating the at least one component of the one or more components and information regarding the failure prediction; and
updating a list of renewable energy assets to perform surveillance based on the list of renewable energy assets that are operating within a healthy threshold.

* * * * *